(12) United States Patent
Montgomery et al.

(10) Patent No.: US 7,346,241 B2
(45) Date of Patent: Mar. 18, 2008

(54) OPTICAL MICRORESONATOR WITH MICROCYLINDER AND CIRCUMFERENTIAL COATING FORMING RESONANT WAVEGUIDES

(75) Inventors: Robert M. Montgomery, Indialantic, FL (US); Michael R. Lange, Melbourne, FL (US); Michael DeRoy, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 255 days.

(21) Appl. No.: 11/114,491

(22) Filed: Apr. 26, 2005

(65) Prior Publication Data

US 2006/0239617 A1    Oct. 26, 2006

(51) Int. Cl.
*G02B 6/26* (2006.01)
(52) U.S. Cl. .............................. 385/50; 385/15; 385/39
(58) Field of Classification Search .................. 385/15, 385/39, 50
See application file for complete search history.

(56) References Cited

U.S. PATENT DOCUMENTS

| | | | | |
|---|---|---|---|---|
| 4,338,570 A | 7/1982 | Kurnit | ......................... | 330/4.6 |
| 5,274,720 A | 12/1993 | Yamamoto | ................... | 385/129 |
| 6,028,693 A | 2/2000 | Fork et al. | .................... | 359/248 |
| 6,052,495 A | 4/2000 | Little et al. | ...................... | 385/2 |
| 6,259,717 B1 | 7/2001 | Stone et al. | .................... | 372/92 |
| 6,389,197 B1 | 5/2002 | Iltchenko et al. | .............. | 385/28 |
| 6,411,752 B1 | 6/2002 | Little et al. | ..................... | 385/17 |
| 6,487,233 B2 | 11/2002 | Maleki et al. | ............... | 372/108 |
| 6,490,039 B2 | 12/2002 | Maleki et al. | ............... | 356/436 |
| 6,636,668 B1 * | 10/2003 | Al-hemyari et al. | .......... | 385/40 |
| 6,661,950 B1 | 12/2003 | Strecker | ....................... | 385/30 |
| 6,865,317 B2 | 3/2005 | Vahala et al. | .................. | 385/30 |
| 6,873,769 B2 | 3/2005 | Miyano et al. | ................ | 385/50 |
| 2002/0041730 A1 | 4/2002 | Sercel et al. | ................... | 385/30 |
| 2003/0002099 A1 | 1/2003 | Sayyah et al. | ............... | 359/124 |
| 2003/0118270 A1 | 6/2003 | Miyano et al. | ................ | 385/15 |
| 2004/0184711 A1 | 9/2004 | Bradley et al. | ............... | 385/16 |
| 2005/0013529 A1 | 1/2005 | Chiu et al. | ..................... | 385/15 |
| 2005/0175356 A1 | 8/2005 | McCallion et al. | .......... | 398/187 |
| 2006/0072875 A1 * | 4/2006 | Bhagavatula et al. | ......... | 385/30 |

FOREIGN PATENT DOCUMENTS

| | | |
|---|---|---|
| JP | 63164382 A | 7/1988 |
| WO | 86/02171 | 10/1986 |

OTHER PUBLICATIONS

Moon et al., "*Cylindrical Microcavity Laser Based on the Evanescent-Wave-Coupled Gain,*" Physical Review Letters, vol. 85, No. 15, Oct. 9, 2000, pp. 3161-3164.

* cited by examiner

*Primary Examiner*—Jennifer Doan
(74) *Attorney, Agent, or Firm*—Allen, Dyer, Doppelt, Milbrath & Gilchrist, P.A.

(57) ABSTRACT

An optical microresonator and method of forming same includes a microcylinder and a circumferential coating formed on the microcylinder. This coating has a higher index of refraction than the microcylinder and is of such thickness relative to the diameter of the microcylinder that a resonant waveguide is formed such that light optically couples from an optical source waveguide onto the microcylinder.

26 Claims, 28 Drawing Sheets

IMPULSE RESPONSE OF 10 GHz BANDPASS GAUSSIAN FILTER

BANDSHAPE FOR GAUSSIAN AND BUTTERWORTH FILTERS

FOUR-PORT RESONANT STRUCTURE

MODELED RIDGE-GUIDED WAVE ON A MICROCYLINDER

TRANSIENT FIELD PATTERNS IN SOURCE GUIDE

TRANSIENT FIELD PATTERNS IN RESONATOR GUIDE

OPTICAL MICRORESONATOR WITH MICROCYLINDER AND CIRCUMFERENTIAL COATING FORMING RESONANT WAVEGUIDES

FIELD OF THE INVENTION

The present invention relates to the field of optical resonators, and more particularly, to optical microresonators that exhibit whispering gallery modes.

BACKGROUND OF THE INVENTION

Telecommunications systems incorporate extensive optical fiber networks using frequency multiplexing/demultiplexing techniques for optical communications signals. These types of optical communications systems require add/drop filters for selecting a single wavelength from complex optical signals that are typically frequency multiplexed together. Also, optical sensors are used at narrow band frequencies and wavelengths and may require add/drop or other functionality. These sensors are required for accelerometers, chemical and biological sensors, and similar applications.

Prior art devices for these add/drop filters and optical sensors include Fabry-Perot structures, waveguide ring resonators, and spherical resonators. Fabry-Perot structures have been widely used for many applications, but have difficult extensions to the multipole. Waveguide ring resonators are planar structures that can be fabricated with little complexity and incorporate a simple extension to the multipole. One drawback is their high losses. Spherical resonators are small in size and have low loss, making them efficient for limited applications. They are not efficient, however, for some applications requiring an extension to multipole filters. Other microcavity geometries incorporate whispering gallery modes and photonic crystals.

FIG. 1 shows a prior art microsphere 20 positioned adjacent an optical fiber 22. A 980 nm SMF and 980 nm optical pump are used as an input and the output is a 1550 nm SMF and 1550 nm laser. The optical fiber 22 is tapered and can be brought in contact with the microsphere 20 and the evanescence light from the optical fiber 22 enters the microsphere 20. Air guided region 24 and vestigial cores 26 are shown. The TEi11 mode of propagation occurs along the "equator" or center portion of the microsphere. This is a well known practice operative in a whispering gallery mode.

Other examples of prior art microspheres operative in a whispering gallery modes have been designed. For example, U.S. Pat. Nos. 6,389,197; 6,487,233; and 6,490,039 assigned to California Institute of Technology, disclose the use of microspheres based on whispering gallery mode microresonators or cavities. An optical probe can be evanescently coupled into at least one whispering gallery mode of the resonator. Optical energy can also be coupled in a waveguide mode, into the resonator that operates in the whispering gallery mode. For example, a fiber in its waveguide mode would couple information to the resonator, e.g., the microsphere. The fiber can be cleaved at an angle to cause total internal reflection within the fiber. The energy in the fiber forms an evanescent field and the microsphere is placed in the area of the evanescent field. If the microsphere resonance is resonant with energy in the fiber, information in the fiber is effectively transferred to the microsphere. Surface gratings can also be placed on the microsphere. This is advantageous because microsphere resonators can have high quality ("Q") factors and small dimensions. They can be a building block for larger fiber optic systems. It is also possible to have a fiber-coupled laser based on a whispering gallery mode resonator formed of a laser gain medium and an angle-polished fiber coupler as disclosed in the '233 patent. The optical fiber can be configured to guide light at both the pump wavelength and a laser wavelength, including an angle-polished facet that forms an angle with respect to the fiber such that the angle-polished facet is positioned with respect to the other resonator to couple evanescently pump light at the pump wavelength in the optical fiber into a whispering gallery mode at the pump wavelength, and also evanescently couple light in a whispering gallery mode at the laser wavelength into the optical fiber.

One prior art improvement over the use of microspheres are toroid microcavities. These microcavities can have ultra-high "Q" factors of about 100 million and a surface-tension induced microscale cavity. Examples include droplets, silica microspheres, and microtoroids.

Toroid microcavities have been formed by photolithography and etching techniques on an oxidized silicon wafer to create silica disks. A gas $X_eF_2$ etch undercuts the silica disks with an induced reflow of the silica using $CO_2$ to cause a smooth toroidal periphery. Toroid microcavities support whispering gallery type modes on a silicon platform and can reduce the mode spectrum compared to spherical microcavities. Microtoroids can also exhibit reduced mode volume compared to microspheres. Two mode-volume compression regimes can include slow compression and fast modal compression.

In a tapered fiber coupling, the fiber tapers in a transition from conventional core guiding regions to air-guiding regions with a vestigial core on either end as shown in FIG. 1. It can include coupling both to-and-from a microtoroid on a chip.

These ultra-high "Q" factor and small mode volume results in high circulating intensities because of the cavity build-up factor. Optical fibers that are tapered result in an ultra-low loss and optimum coupling of the microcavities. The cavity build-up factor and non-linear threshold level can be exceeded as indicated from the equation below:

$$\left(\frac{P_{cav}}{P_{in}}\right) = \frac{\lambda}{\pi^2 nR} \cdot \frac{Q_{ex}}{\left(1 + \frac{Q_{ex}}{Q_o}\right)^2}$$

$P_{in} = 1$ mW $V_m \sim 650$ $\mu m^3$ $P_{circ} \sim 110$ W $I_{circ} \sim 2.5$ GW/cm$^2$ There have also been some experiments on stimulated Raman scattering in microspheres. The stimulated Raman scattering causes red shift of a pump (100 nm shift in a telecommunications band). Threshold levels can be typically 100 microwatts for UHQ microtoroids and high quantum efficiencies result because of an ideal coupling junction. Similar results can occur with toroid microcavities. The stimulated Raman scattering for toroid emission is typically single mode.

A prediction of threshold using bulk Raman gain constant (doubly resonant process) can be:

$$P_{thresh} = \frac{\pi^2 n^2 V_{eff}}{\lambda_P \lambda_R f g C(\Gamma)} \cdot Q_{ex}^P \cdot \left(\frac{1}{Q_t^P}\right)^2 \cdot \frac{1}{Q_t^R} \alpha \frac{V_{eff}}{Q^2}$$

A minimum threshold undercoupled could be:

$$Q_{ex}^{min} = 2Q_0 (\Rightarrow T \approx 11\%)$$

The Raman threshold can also affect the mode volume as follows:

$$V_{eff} = P_{thresh}^{min} \cdot Q_o^2 \frac{\lambda_P \lambda_R f g C(\Gamma)}{\pi^2 n^2} \frac{4}{27}$$

P: Raman threshold
$\lambda_p$, $\lambda_R$: pump and Raman emission wavelength
g: Raman gain coefficient
C($\Gamma$): intermode coupling parameter
Q: Quality factor of pump and Raman mode
Stimulated Raman threshold can be used to infer the mode volume $V_{eff}$.

$$V_{eff} = P_{thresh}^{min} \cdot Q_o^2 \frac{\lambda_P \lambda_R f g C(\Gamma)}{\pi^2 n^2} \frac{4}{27}$$

Although spherical resonators, waveguide ring resonators, Fabry-Perot structures and toroid microcavities have been advantageously used as indicated above, these devices still have limitations when optical fibers are coupled, even though these devices often are easily fabricated.

Published patent application no. US 2002/0041730, published Apr. 11, 2002, discloses a method for fabricating an optical resonator on an optical fiber by generating a differential of a physical property, for example, the diameter, density, refractive index, or chemical composition of a transverse segment of the resonator fiber. This could include some type of grooves forming the resonators. The resonator fiber segment can substantially confine a circumferential optical mode propagating around the resonator fiber segment circumference at least partially within the resonator fiber segment. This enables substantial confinement of a substantially resonant circumferential optical mode near a surface of the fiber. As a result, evanescent optical coupling can occur between circumferential optical modes and an optical mode supported by the second optical element. Different techniques for spatially, selectively generating the differential could include masking/etching, masking/deposition, laser machining, laser patterning and combinations of the different processes. It is also possible to include a plurality of resonators in the same fiber sufficiently close together to enable optical coupling between them to provide a frequency filter function for optically coupling multiple optical elements, including optical fibers. Although the optical resonator can provide some coupling, it is limited in its use and may not provide adequate coupling for input/output functions. Its manufacturing requires non-rotating upper and lower capillary tubes to hold a spinning optical fiber, which may not ensure accuracy and have excess tolerance. Some limited teaching for using a single, tapered optical fiber near the microcylinder is also proposed. It also does not address polarization issues, slower waveguide structures, multiple node contacts, and the use of coatings for imparting waveguide resonance or similar issues.

SUMMARY OF THE INVENTION

In view of the foregoing background, it is therefore an object of the present invention to provide an optical microresonator that can be formed as a microcylinder and provide a resonant waveguide operative with a circumferential coating.

This and other objects, features, and advantages in accordance with the present invention are provided by a optical microresonator that is formed as a microcylinder and a circumferential coating formed on the microcylinder, which has a higher index of refraction than the microcylinder. This circumferential coating is of such thickness relative to the diameter of the microcylinder that a resonant waveguide is formed such that light optically couples from an optical source waveguide onto the microcylinder. The microcylinder is about 8 to about 150 microns in diameter. The circumferential coating is about 0.2 to about 1.0 micron in thickness. The circumferential coating has a film index ranging from about 1.4 to about 1.6. The circumferential coating can be formed from polymer material such as a plastic material. Also, coupling elements can be formed on the coating to change the direction of light coupled onto the microcylinder.

In another aspect of the invention, an optical source waveguide can carry light therethrough and couple onto the microcylinder and circumferential coating. The optical source waveguide forms input and output ports, and includes a plurality of microcylinders positioned adjacent the optical source waveguide. Each microcylinder has a circumferential coating with a higher index of refraction than the microcylinder and of such thickness that light optically couples from the optical source waveguide onto the microcylinder to form an add/drop filter. A method of forming the optical microresonator is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
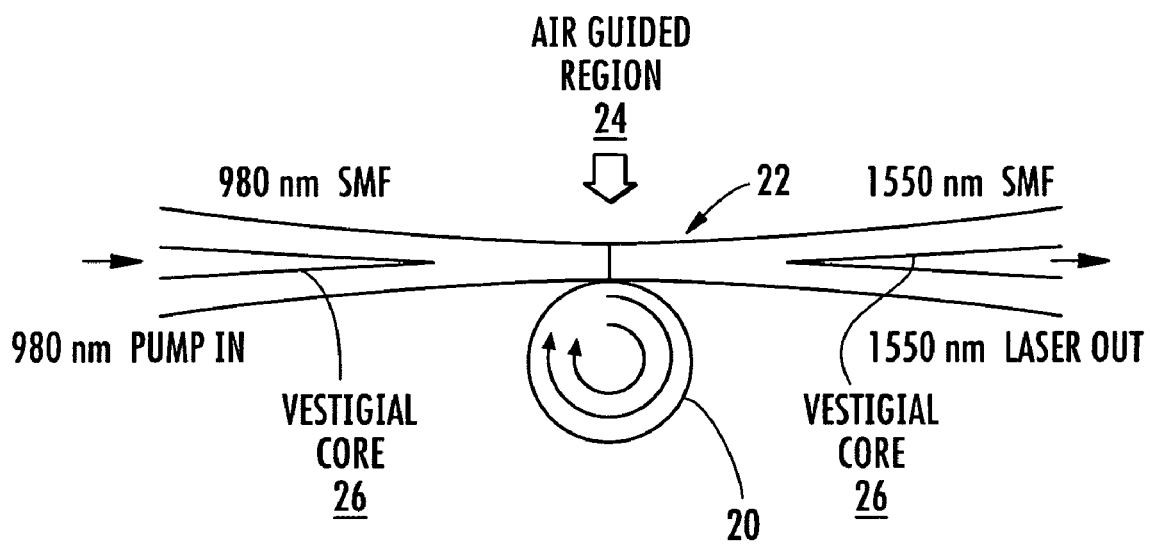
FIG. 1 is a fragmentary drawing of a prior art microsphere positioned adjacent an optical fiber to provide coupling between the optical fiber and microsphere.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is advantageous over prior art spherical resonators, waveguide ring resonators and Fabry-Perot structures, including toroid microcavities, and simple cylindrical resonators as described in the incorporated by reference '730 published patent application. The present invention is directed to an optical microresonator that includes a resonant waveguide formed on a microcylinder, for example, spaced resonant elements, such as circumferential ridges, forming a resonant waveguide on the microcylinder for coupling to and from optical input and exit waveguides. These resonant elements could include ridges, some types of grooves, etched surface configurations, dielectric lines or other dielectric placements, or coatings. Whispering gallery modes on a microcylinder can use a one-dimensional beam propagation coating and an effective index profile to account for a cylindrical geometry, for example, with a 120 micron microcylinder, n=1.498, Gaussian mode with 8.3 micron mode field diameter, on right microcylinder and immersed in water, n=1.33. For purposes of explanation, basic functions of a resonant waveguide on a microcylinder in accordance with one non-limiting example of the present invention are explained.

A waveguide on a microcylinder can form a homogenous waveguide structure and can be extended to complex, coupled structures. Although prior art microsphere technology is a simple, natural geometry and readily available because of its wide application in biochemistry and as a filler with concomitant ease of fabrication, microspheres are difficult structures for use in compound/multipole structures. Microcylinder resonant waveguides of the invention can be formed by ultraviolet laser writing on a rotating microcylinder, for example, by cutting ridges or exposing to light a photoresist-coated microcylinder, as will be explained in greater detail below.

In the present invention, light impinges on the microcylinder having the resonant waveguide and can be considered to be guided around the curved surface forming the microcylinder without lateral guidance. In one example of the present invention, however, lateral spreading is prevented by using the resonant waveguide on the microcylinder and confining the energy and preventing the energy from moving axially down the microcylinder and then spreading. In some aspects of the present invention, depending on the configuration, it is possible to place spaced, circumferential ridges on the microcylinder, forming resonant elements, e.g., resonators, and thus forming a resonant waveguide. It is also possible to place a layer of glass on top of the microcylinder to form a resonant waveguide. Circumferential spaced ridges as resonators can also be placed on the glass. In other aspects of the present invention, it is possible that light can move around the microcylinder against its surface and ridges or an extra layer is not required.

In some cases, it is desirable to etch the circumferential ridge for the resonant waveguide around the microcylinder. In one non-limiting example, a collar of photoresist could be placed on the fiber, which is chemically etched at a fraction of a micron, enough to form a resonant waveguide. The photoresist could be exposed to light from a laser, for example. When the photoresist is stripped off, that fiber area that has not been etched is untouched glass and forms a resonant waveguide. It is also possible to couple two microcylinders together using precise lithographic techniques. It is also possible to control the height of any ridges and control the coupling between resonators forming the resonant waveguide of the optical microresonator. Two coupled resonators or ridges could be formed on the same microcylinder, for example, an optical fiber, by writing two lines or ridges and etching the devices, as compared to difficulties in the prior art that occur when two spheres are positioned adjacent each other. A spiral resonant waveguide could be formed, in accordance with the present invention, to act as a slow wave structure, such that the speed of light propagating along the microcylinder is slowed. This is similar to a traveling wave tube. Instead of electromagnetic waves, however, the optical microresonator of the present invention is used with light. A helical structure could be formed on the microcylinder as a spiral or other configuration to form a slow wave optical microresonator.

The spiral turn spacing can be configured such that when the next spiral turn occurs, the resultant fields do not couple to the first spiral turn. It is also possible to make a slower optical microresonator using spiral turns with a wider wrap. Also, two spiral turns could couple to each other making a slow wave optical microresonator.

The optical microresonator of the present invention is advantageous and also allows coupling of source and exit optical waveguides along the axis of the microcylinder.

There are different ways to couple these waveguides to the optical microresonator, in accordance with the present invention. These techniques include configuring a source or exit optical waveguide, for example, an optical fiber, perpendicular or transverse to the axis of the microcylinder. When correctly positioned, any light received within the optical source waveguide couples to the microcylinder and travels around the microcylinder. It is also possible to add coupling elements, for example diffraction gratings, as one non-limiting example, at different angles to the resonant waveguide, for example, 90 degrees, such that the light propagates and turns or switches direction. It is also possible to place a perturbation as a coupling element, for example, a 45 degree cut, ridge, diffraction grating or other perturbation, between two ridges such that light initially travels one direction and then travels another direction. The light could travel in one direction, and the 45 degree cut or perturbation could cause the light to travel the other direction. There could be a sequence of these perturbations or cuts that can be formed by etching. They could be formed on the surface of different resonant elements forming the resonant waveguide. They can also be fabricated as a notch.

It should be understood that if the optical microresonator is wide enough, a light wave will not spread because of its width, and the 45 degree (or other degree) perturbations, or other coupling element can start the light moving around the microcylinder. It is possible to have a wide resonator. The 45 degree lines could be etched or laser formed bumps or grooves on the microcylinder.

The cylindrical optical microresonators of the present invention can be formed by writing a pattern on an optical fiber as it rotates. This optical fiber can be dip coated in photoresist and pulled out while an ultraviolet laser exposes the photoresist. During laser writing, the optical fiber can be rotated and moved axially in a predetermined manner and any pattern written on it by a fixed position laser, similar to a lathe. Etching could occur to remove the resist in selected areas. Of course, the laser could also be movable, but this would require a complicated control mechanism.

Because it is necessary to have write accuracy to a micron in this type of process, a fiber ferrule can be used for exact placement. The ferrule is similar to an optical fiber connector and includes a very precise fiber guide in its center. The fiber ferrule can be formed as a precision ceramic through which the fiber passes. In the present invention, first and second spaced ferrules can receive optical fiber and allow it to be fed. Clamps engage and hold the optical fiber within a first ferrule. A chuck can be used for rotating the ferrule and fiber. The process would still be advantageous even if there is some inaccuracy in the chuck positioning because the optical fiber is constrained by the precisely designed ferrules. Thus, the axis of rotation and the axis of symmetry are very close using these ferrules. Although two ferrules are illustrated to control axial movement, more could be used. Also, depending on design, only one need be used.

The fiber can be drawn down to a diameter of about 8 to about 10 microns for use as a microcylinder, and that thin a fiber would still be useful as a microcylinder. Although a range of fiber thickness can be provided for a microcylinder, an upper limit even as high as about 150 microns is possible, and a smaller diameter of 8 microns is possible with the present invention. The fiber could also be drawn through a photoresist such that the surface tension causes the photoresist to spread evenly along the fiber. The pressure generated by the surface tension increases as the fiber radius decreases. In this application, the pressure is about equal to the surface tension of the fluid divided by the radius of curvature. Thus, a smaller fiber would generate a larger amount of pressure. A laser could expose the photoresist for etching or other processing.

It is well known that light has two possible polarization states that may not resonate at the same frequency on a cylindrical optical microresonator of the present invention. It is more desirable, of course, to have light polarized in a single state at a single frequency, such that the resonances operative with the cylindrical optical microresonator have the same frequency for both polarizations.

In the present invention, it is possible to bring the two polarization states into degeneracy at the same resonant frequency. This can be accomplished in one non-limiting example by placing another layer or coating over the microcylinder. This coating would have the proper thickness and proper refractive index, according to end use requirements. The polarization can be tuned and have the same polarization in both states. For example, with a 10 micron diameter fiber, the polarization resonances are distinct and separate from each other.

In one computer-modeled example, a layer of coating material with a refractive index of about 1.5 can be placed at about half a micron on the resonator, although about 0.2 to about 1.0 micron thick coating can be an acceptable range and be operable depending on end use and microcylinder design. The polarization states degenerate. This would bring the two polarizations into the same frequency. In this example, it is possible that some polymer material could be formed on the fiber as a coating surface to have a higher index and can be formed as a permanent part of the structure. For example, polystyrene or other plastic materials could be used and positioned over the microcylinder and have a thickness for proper polarization.

For purposes of understanding of the present invention, further technical background and a brief explanation concerning fiber wavelength division multiplexed channels is discussed relative to coupled arrays of resonant waveguide forming by resonators or ridges on the microcylinder.

The fiber communications industry has settled on a telecommunications grid of absolute frequencies where fiber wavelength division multiplexed channels are located. The communications grid is located on lines separated by integral multiples of 100 GHz (0.8 mm) from an absolute frequency of 193.1 THz (1552.52 nm). It is possible to use subdivisions of this grid, such as lines at 50 GHz spacing, or clusters of closely spaced wavelengths clustered around a 100 GHz line. As a result, filters and other components are required for building the networks and communication systems based on this WDM channel structure.

Figure 6:
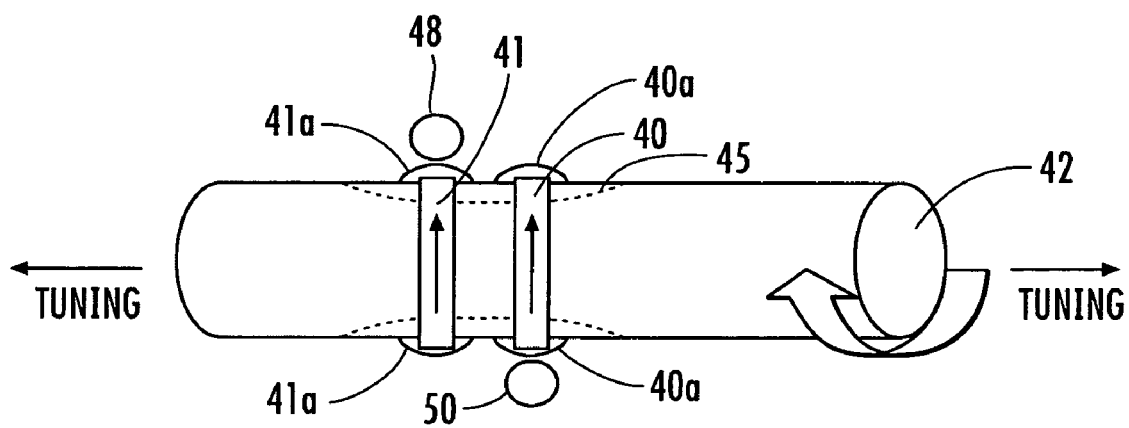
FIG. 6 is a fragmentary side elevation view showing an optical microresonator having a resonant waveguide formed on a microcylinder, and formed from coupled resonators as circumferential ridges in accordance with one non-limiting example of the present invention.

For example, a 10 GHz wide (−3 dB double sided, 10 gigabit bit rate) channel, near 1552 nm, is a basic WDM unit that can be added or dropped without significant degradation to the channel performance. It is often necessary to achieve at least 30 dB isolation from adjacent channels that are spaced 50 GHz away. As a non-limiting example of the present invention, the optical microresonator coupling system of the present invention is described and assumed in one non-limiting example such as shown in FIG. 6 to be a single mode "in", and a single mode "out" coupling system. It may not be possible to achieve the goal of channel dropping by selectively absorbing or scattering a single channel and not collecting the lost energy. This assumption is important in this non-limiting example because it implies reciprocity between the "in" and "out" single modes.

Typically, the physical size of an optical microresonator is a constraint, but no physical size limit is assumed in this non-limiting example. At the present level, the fundamental limits on size can be determined by the device physics and sometimes by application requirements.

Linear system theory, closely related mode coupling theory, and electromagnetic theory are applicable in any design configuration used for the present invention. The filter impulse response and frequency response can be chosen to model a problem because these responses represent a general, highly developed theory and provide direct physical insight into various configurations that might be used to implement the optical microresonators of the present invention. In particular, the impulse response is readily visualized as a sequence of taps along a fiber delay line. To simplify this example and enable quick evaluations of these approaches, it is convenient to use a low coupling approximation, for example, as a negligible depletion of an input beam. Devices that perform the proper filtering function in the low coupling approximation can be redesigned to achieve the proper weighting with high coupling conditions.

Typically, signals are expressed in a complex, translated-to-baseband representation, and the carrier frequency is not shown. "Impulses" can be defined as short bursts of a few cycles of carrier signal at, for example, 1500 nm wavelength. Thus, tap delay can provide a correct baseband phase and provide a correct carrier phase with orders of magnitude more stringent and difficult than the baseband requirement. A difficulty in fabricating actual optical microresonators, for example, as filters, is maintaining the carrier phase through the structure of a filter that is physically large. The tap structure may be recursive, as in a circulating loop, or it may be an extended structure with a tap weight distribution representing a desired impulse response.

Responses can be limited in the time domain because of size and construction complexity, and in the frequency domain because of crosstalk and channel isolation. Gaussian models could be used for weighting time and frequency when a nominal weighting model is required. A Gaussian weighting is known to yield compact signals in both domains simultaneously and represents performance close enough to most reasonable weighting profiles for an analysis.

Figure 2:
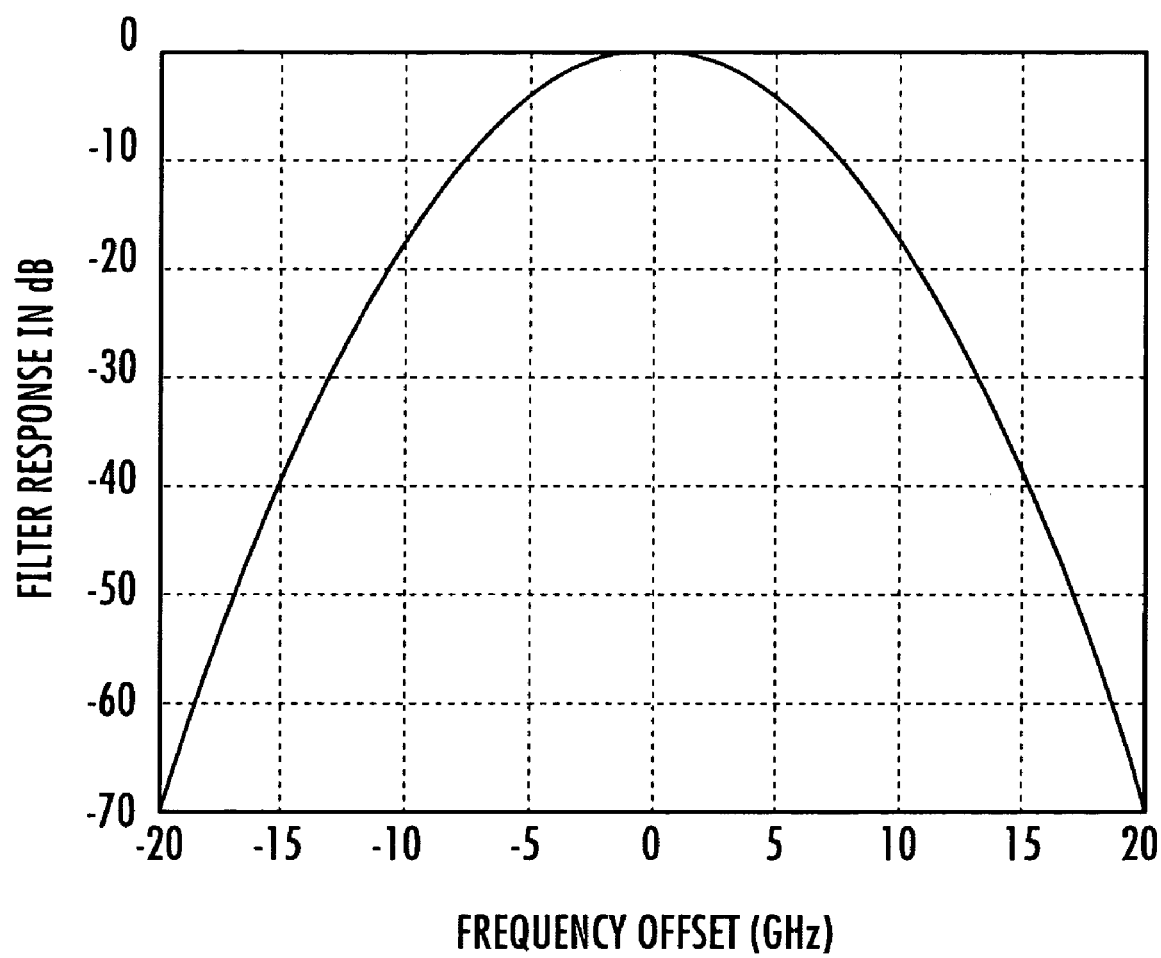
FIG. 2 is a graph showing a tap field strength weight distribution with delay of an impulse response for a Gaussian filter and showing the filter response relative to the frequency offset.
Figure 3:
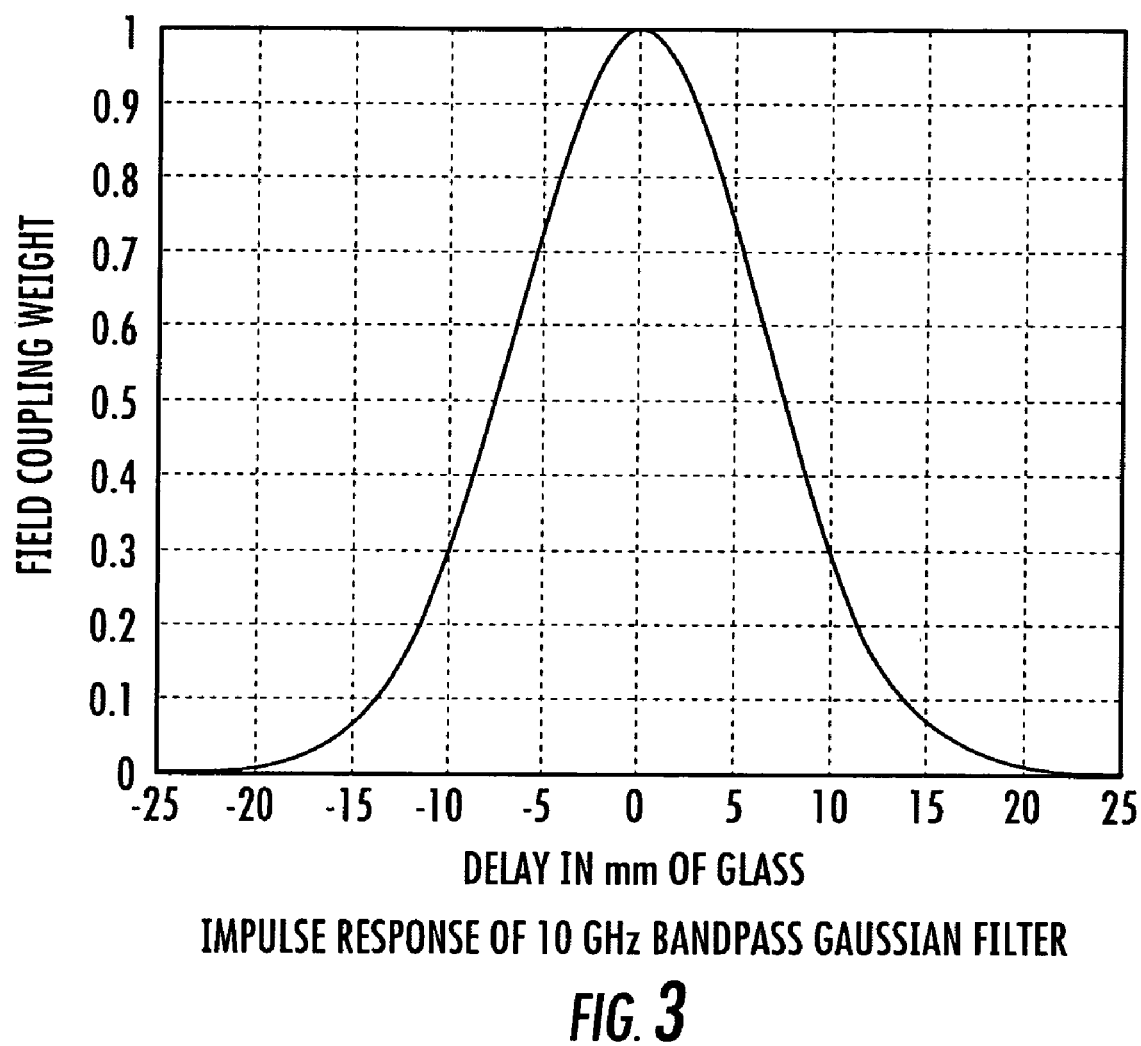
FIG. 3 is a graph showing the impulse response of a 10 GHz bandpass Gaussian filter and showing the field coupling weight relative to the delay in millimeters of glass.

One example of a desired bandpass function for a Gaussian 10 GHz channel filter that is applicable to the present invention is illustrated in FIG. 2. This filter isolates channels at 50 GHz or more spacing. The tap field strength weight distribution with delay as an impulse response for this Gaussian filter is shown in FIG. 3.

Figure 4:
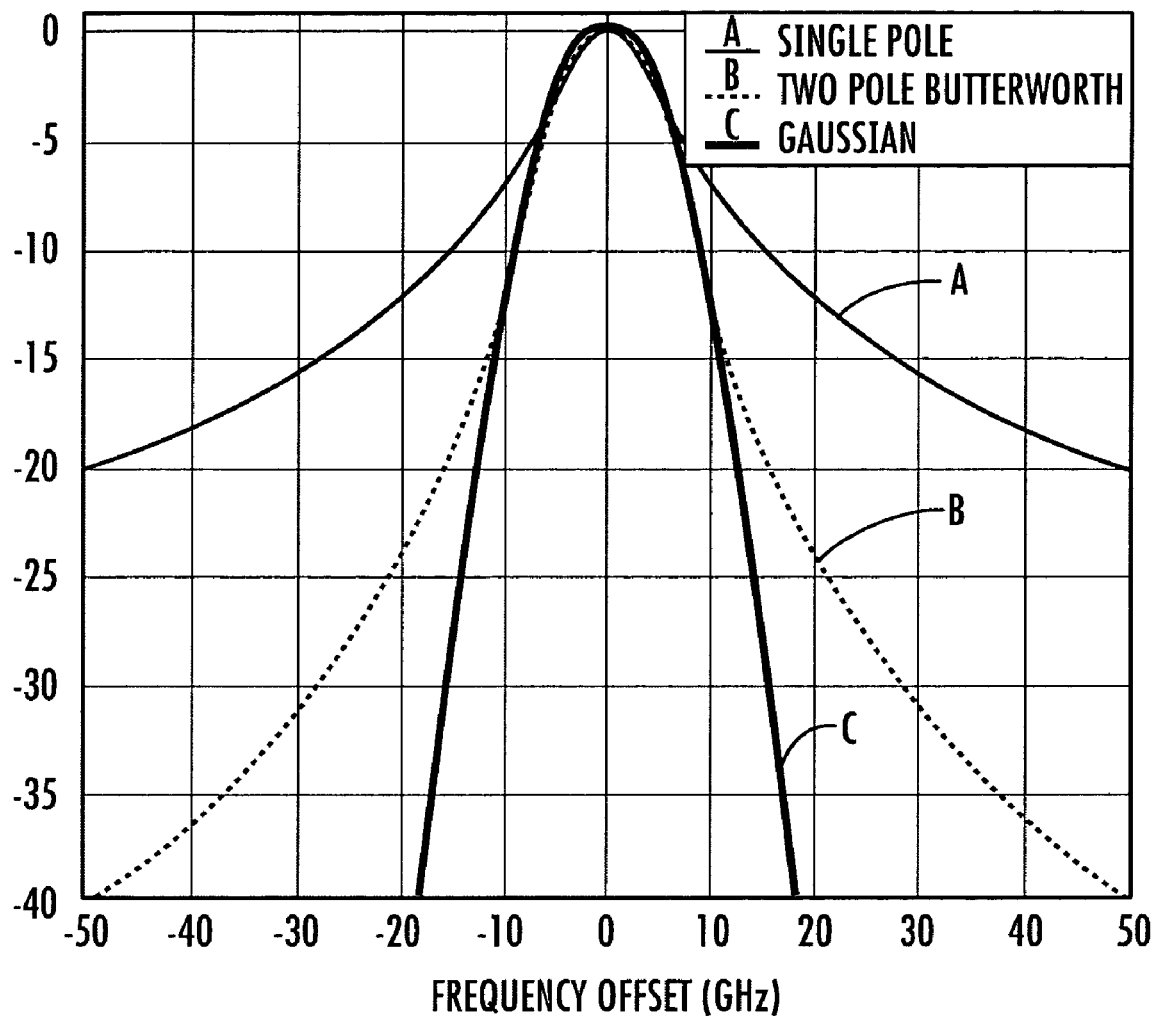
FIG. 4 is a graph showing the band shape for Gaussian and Butterworth filters.

Filters such as Butterworth, Chebychev, and similar filters have different trade-offs of skirt depth, in-band ripple and/or other performance measures. The frequency response of 10 GHz bandwidth filters of three sample types is shown in FIG. 4. The single pole Butterworth is the band shape of a filter based on a single coupled resonator. This response is marginal for DWDM channels (10 Mb/sec channels on 50 GHz centers). A filter formed of two coupled resonators could produce a second order Butterworth response when the resonator parameters are chosen appropriately.

Referring again to FIG. 3, this graph shows a better evaluation of potential filters operative with the present invention. To approach a filter performance as shown in FIG. 2, a filter could have delay values comparable to those illustrated in FIG. 3. In this example, there could be a path delay difference equivalent to approximately 30 millimeters of glass between a first coupling point and a last coupling point.

As an example, a filter could be chosen similar in function as a planar waveguide having a grating coupler overlay. The frequency of the grating in this example weakly couples the guided wave to a free space wave propagating at thirty degrees to the plane of the waveguide. The relative delay over the length of the grating could be expressed as $L_d=Lg-Lg*\cos(30)/n$. Approximately 90 mm of waveguide may be required to implement this filter. This example represents a configuration that may not be as advantageous for an add-drop filter because it couples to the wavelength bands simultaneously. Different wavelength bands couple at different angles less than the 30 degrees in which a chosen wavelength couples. A filter of this free space coupling configuration is more applicable as a wavelength multiplexer/demultiplexer as compared to an add-drop filter.

In order to function as an add-drop filter, a filter should interact only with the wavelength of the channel that is switched, and leave all other channels unperturbed. This makes it impractical to construct an add-drop filter based on coupling from many modes or to many modes. To be practical as a single channel, add-drop device, the device should couple single mode to single mode. The example given above could violate this criterion because the free space output is in effect a continuum of modes. The channel being switched couples effectively to one range of the modes, but the other wavelengths are perturbed because they couple to another range of output modes (angles). A similar situation occurs with a multimode waveguide coupler. The operating wavelength couples one particular mode to another particular mode, but coupling to other mode sets will occur on other wavelength channels.

In the present invention, the resonant structures such as parallel circumferential ridges, spiral ridges, or a coating, or a combination of one, two or all three that form a resonant waveguide of the present invention, can be used to achieve more compact filter structures which achieve delays by reusing the same path many times through recirculation. Such structures have an impulse response that consists of an exponentially decaying sequence of pulses spaced by a time equal to the transit time around the recirculating structure. This sequence of equally spaced pulses represents a filter with multiple passbands occurring periodically in the frequency domain with a frequency spacing or free spectral range equal to the reciprocal of the pulse spacing. Resonant structures forming the resonant waveguide for an optical microresonator can achieve the required long delays in compact structures.

Figure 5:
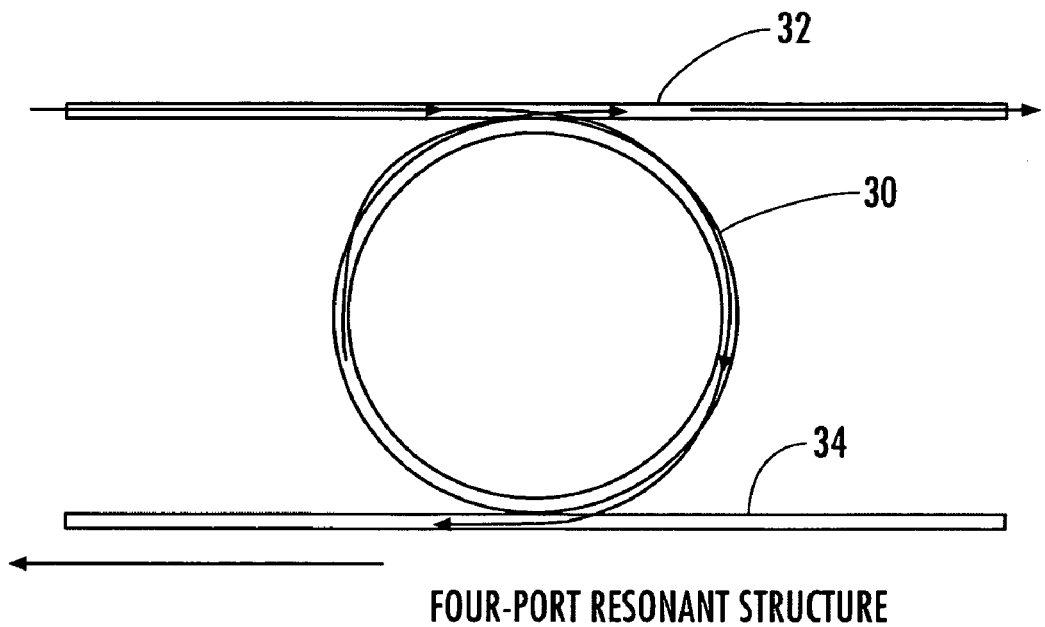
FIG. 5 is a fragmentary elevation view of a single mode, four-port optical microresonator coupling system in accordance with one example of the present invention.

A single mode, four-port optical microresonator 30 in one non-limiting example of the present invention is illustrated in FIG. 5. This optical microresonator 30 forms an optical microresonator coupling assembly because of the optical source waveguide 32, and optical exit waveguide 34. Light is received in the optical source waveguide 32, for example, an optical fiber. The light is received on the microresonator 30 and exits out the waveguide optical exit 34. The resonant structures in some devices, however, commonly take the form of whispering gallery modes in spheres or planar waveguide rings, but in the present invention, are associated with the microcylinders. A drawback of microspheres has been their use as optical couplers necessary for efficient sphere model excitation.

In contrast to microspheres, whispering gallery modes in microcylinders typically lack the confinement of the fields in the lateral direction. In accordance with one non-limiting example of the present invention, however, confinement can be provided by circumferential ridges forming a resonant waveguide on the surface of the microcylinder. The microcylinder could also have a coating. In another aspect of the present invention, a resonant waveguide formed from ridges or a spiral of ridges of the same or different material as the microcylinder is advantageous. Different resonant waveguides could be formed on a microcylinder and be coupled or uncoupled to each other. For example, spaced groupings of ridges could provide different resonant waveguides.

Following the conventional practice of waveguides formed on planar surfaces, a waveguide can be formed on a microcylinder by forming a ridge of transparent material deposited on the surface of the microcylinder. If this design is continued for approximately 1.5 micron wavelengths, the ridge can typically be a few microns wide, a micron or two thick, and have a refractive index slightly larger than that of the microcylinder.

An example of a microcylinder structure is shown in the incorporated by reference '730 application, but an improved structure is shown in FIG. 6. As a non-limiting example, two resonators as ridges 40,41 are formed on the microcylinder 42 and form a resonant waveguide. Only two ridges are illustrated for purposes of description, but many could typically be formed. A typical input/output coupling system is formed by using two coupled waveguides 48,50, formed as optical fibers, in this non-limiting example. The circles positioned adjacent the ridges indicate cross sections of the optical source waveguide, i.e., input port and optical exit waveguide, i.e., output port, and operative as couplers. The resonators or ridges 41, 40 may be directly coupled together by field overlap due to the spatial proximity of the two resonators or ridges. The waveguide can also be formed by a selected, transparent material with an index higher than that of the microcylinder body and applied as a coating 40a, 41a over the ridges, or in some instances a coating is applied only over the microcylinder. The coating could be formed from polyethylene, polyamide, or glass over the ridges 41, 40 or on the fused silica microcylinder. Other materials could be used. This coating alone could operate as the resonant waveguide, or ridges developed into the coating. Tuning can sometimes be provided by moving the microcylinder and its resonant waveguide relative to the source optical waveguide. The dashed lines 45 indicate a possible taper (shown exaggerated) that can indicate a taper formed in the microcylinder. It can be microns only but enough to provide tuning. Also, it should be understood that the height, spacing and angle of the ridges could impact tuning and polarization properties.

Many resonators or ridges can be fabricated on a single microcylinder with a high degree of control and flexibility in the coupling between them. For example, complex, multiple filters can be constructed by cascading many resonators to form a number of different resonant waveguides on a single microcylinder with controlled coupling along the microcylinder. Tuning could be achieved by tapering the microcylinder such that adjacent resonators or ridges on separate resonant waveguides have different frequencies. For example, tuning could also be achieved by mechanically sliding a microcylinder along its axis to change which series of ridges or resonators are operable with optical source or exit waveguides, and thus which optical microresonator is operative with an optical source waveguide. A slow wave structure could be formed by arranging a long string of resonators or ridges with the proper coupling between them. Also, placing a helical, i.e., spiral resonant waveguide structure on the microcylinder would form an optical slow wave optical microresonator. The coupling between the spiral turns can be controlled by choosing the proper pitch and waveguide width.

Many prior art optical waveguides have been fabricated on planar structures using conventional planar lithography, photoresist masking, plating and etching techniques. Forming resonant waveguides and similar waveguide structures on microcylinders, such as shown in FIG. 6, requires different manufacturing processes. In one aspect of the present invention, it is possible to fabricate the resonant waveguides using direct writing with a focused laser beam.

Figure 7:
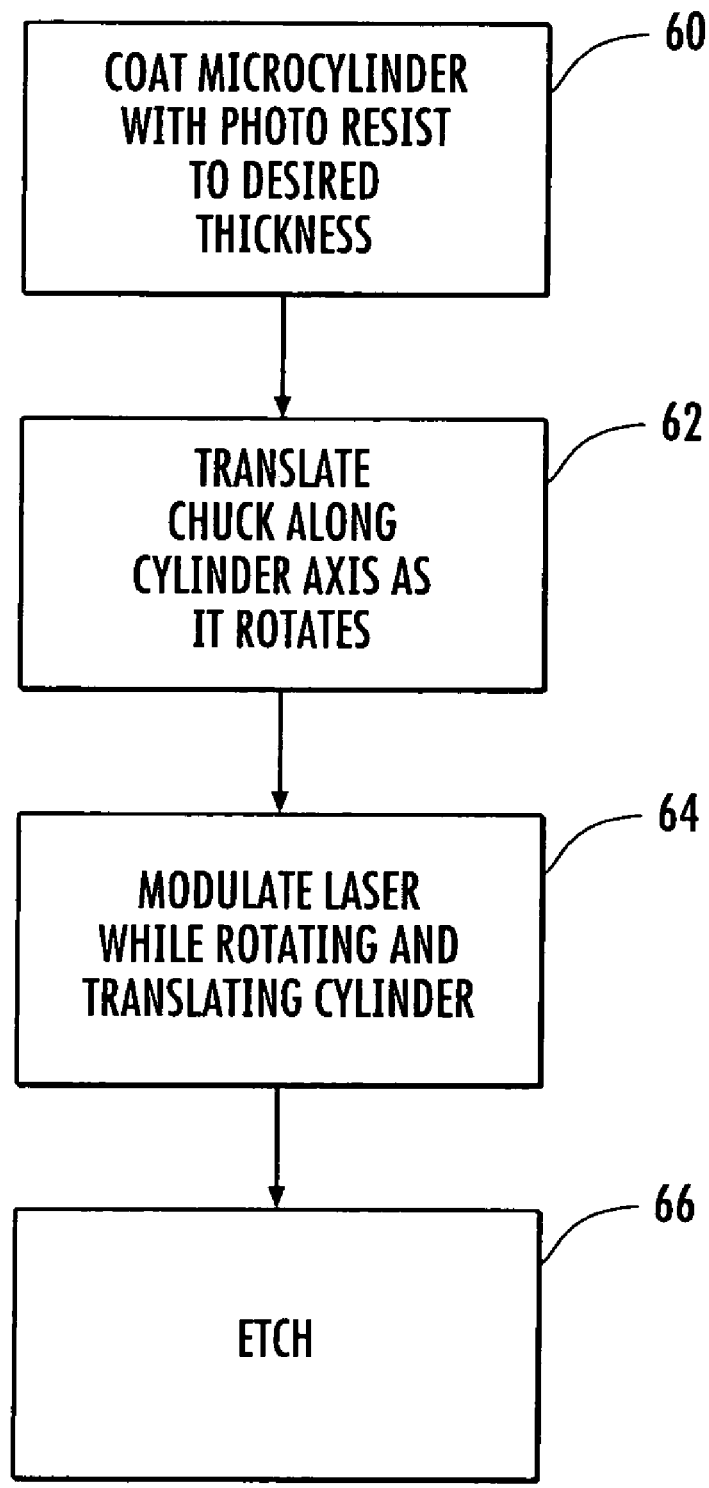
FIG. 7 is a high level flowchart illustrating a method of forming the resonant waveguide as coupled resonators on the microcylinder, for example, as shown in FIG. 6, in accordance with one example of the present invention.

FIG. 7 is a high level flow chart illustrating basic steps as one non-limiting example used for fabricating the resonant waveguide on a microcylinder in accordance with the present invention. The initial microcylinder could be provided from silicon, optical fiber material. It would include an outer cladding and inner core, and could be about 8 to about 150 microns or larger in diameter. In one non-limiting step it is coated with photoresist to a desired thickness (block 60) and placed in a precision rotating apparatus or chuck, similar to a lathe chuck. The chuck assembly is translated to a small circle of approximately 1 to 10 microns at the surface of the microcylinder. The chuck assembly can be moved longitudinally in a direction of the microcylinder axis as it rotates (block 62). The translation mechanism could be a precision motion stage under computer control. A laser beam is modulated to expose the photoresist, while rotating and moving the microcylinder to produce complex and useful patterns (block 64). Etching and possibly plating can be used on the photoresist masks (block 66) to produce a finished product having formed ridges as resonators to form an optical microresonator with a resonant waveguide.

Figure 8:
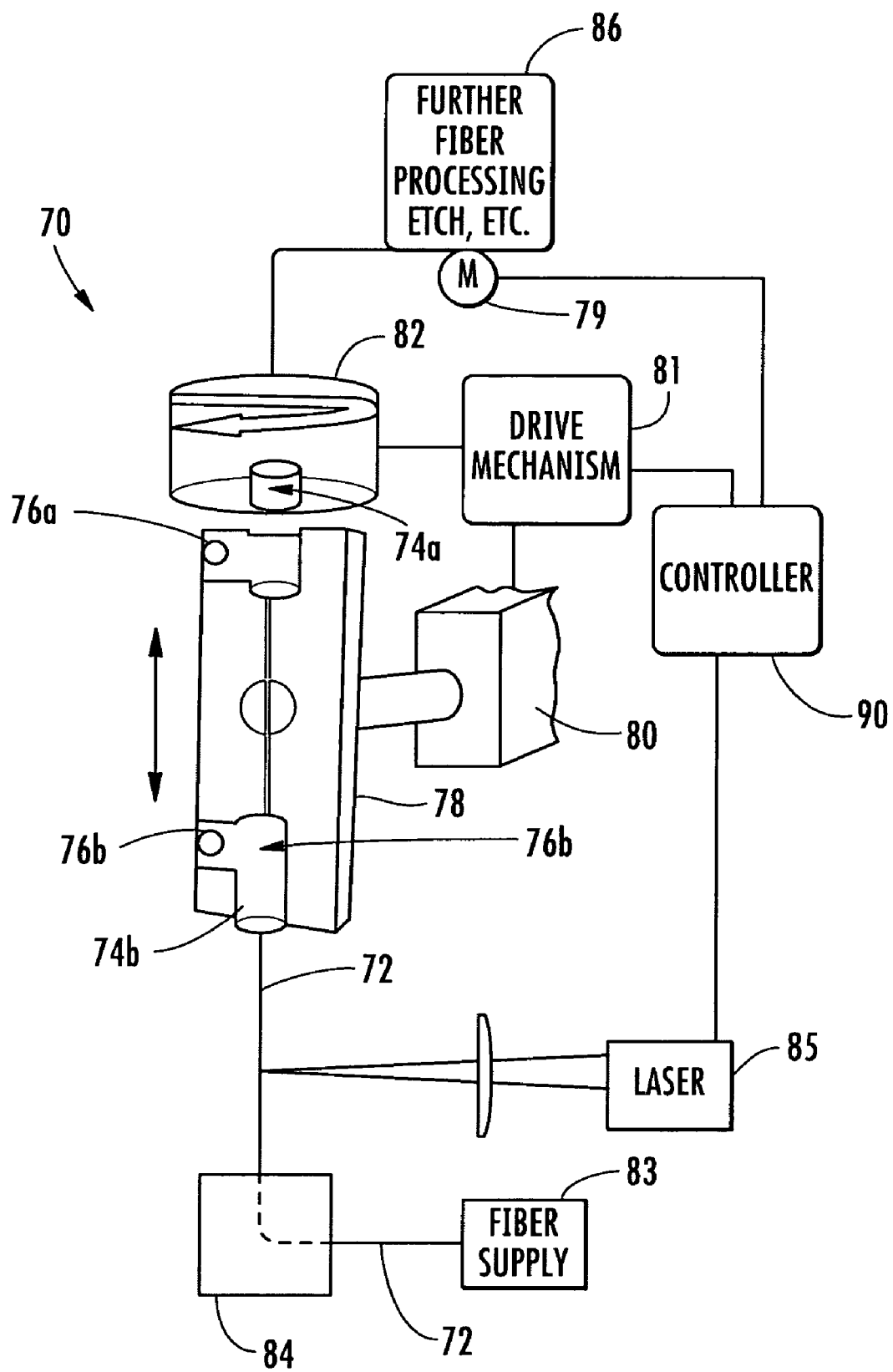
FIG. 8 is a fragmentary, partial isometric view of an apparatus used for forming the resonant waveguide on a microcylinder, in accordance with one example of the present invention.

FIG. 8 illustrates one non-limiting example of an apparatus 70 that can be used for forming an optical microresonator having microcylinder resonators or ridges of the present invention forming a resonant waveguide. The apparatus 70 can use a laser "lathe" fabrication technique with or without photoresist and etching steps. As illustrated, an optical fiber 72 that is to form a microcylinder is fed through first and second spaced ferrules 74a, 74b, which are supported by an upper and lower clamp 76a, 76b on a support member 78. The ferrules 74a, 74b include precision fiber guides through which optical fiber passes, such as drawn by a drive mechanism 79, which includes an appropriate drive motor. The ferrules are typically formed from ceramic, similar to optical fiber connector ferrules. The upper clamp 76a can be designed to allow the ferrule 74a holding the fiber 76 to rotate with the fiber inside. The lower clamp 76b can be operative such that the fiber rotates within the ferrule, but the ferrule 74b does not rotate. The support member 78 is positioned on an x, y, z stage 80. A drive mechanism 81 engages and drives the x, y, z stage 80 and is controlled by a controller 90. The stage 80 allows longitudinal movement along the axial fiber direction. A chuck and drive mechanism 82 connects to the upper ferrule 74a. The clamps and ferrule can be designed such that the fiber can be positioned and rotated by the chuck and translated longitudinally by the stage. Fiber can be drawn from a fiber supply 83 through a photoresist 84, where the fiber is coated. The laser 85 provides appropriate light exposure of the coated fiber for further processing, such as etching, in one non-limiting example, at a processing station 86. The fiber can be fixed to the upper ferrule 74a to allow rotation and longitudinal translation in an accurate and precise manner driving the laser writing step. Thus, fiber can be drawn from supply 83, its movement stopped, then precisely controlled while laser writing occurs to make a pattern. It should be understood that the laser can be operative for machining any ridges or grooves directly on the fiber.

A non-limiting example of the type of fiber that can be used as a microcylinder in the present invention is SMF28 or similar single-mode fiber coated in photoresist. A non-limiting example of a laser source that can be used in the present invention is a 364 nm laser.

Light can be analyzed that propagates in cylindrical guiding structures, i.e., the resonators or ridges, as described above, or in similarly designed microcylinder resonators operative to form a resonant waveguide. An example could be an infinite microcylinder of radius, r, and refractive index, $n_1$. The microcylinder can be immersed in a medium of refractive index, $n_2$. The coordinate system can be chosen with a z-axis parallel to the microcylinder axis and a y origin at the center of the microcylinder. A whispering gallery type guided wave would be assumed to propagate just inside the microcylinder boundary. This wave is undergoing a continuous reflection from the index discontinuity at the boundary. A simplifying approximation can be used to replace the circular microcylinder geometry with an equivalent planar geometry. Because the fields are confined to propagate along the circular boundary, the components at a larger radius would propagate proportionately farther. This is approximately equivalent to a planar system with a refractive index that varies linearly with the distance from the now planar boundary. This technique can be used to analyze bends in optical waveguides. The effective index for the planar equivalent guide is:

$n=n_1 y/r$, in the region just inside the microcylinder (y<0); and $n=n_2 y/r$, in the region just inside the microcylinder (y>0).

Figure 9:
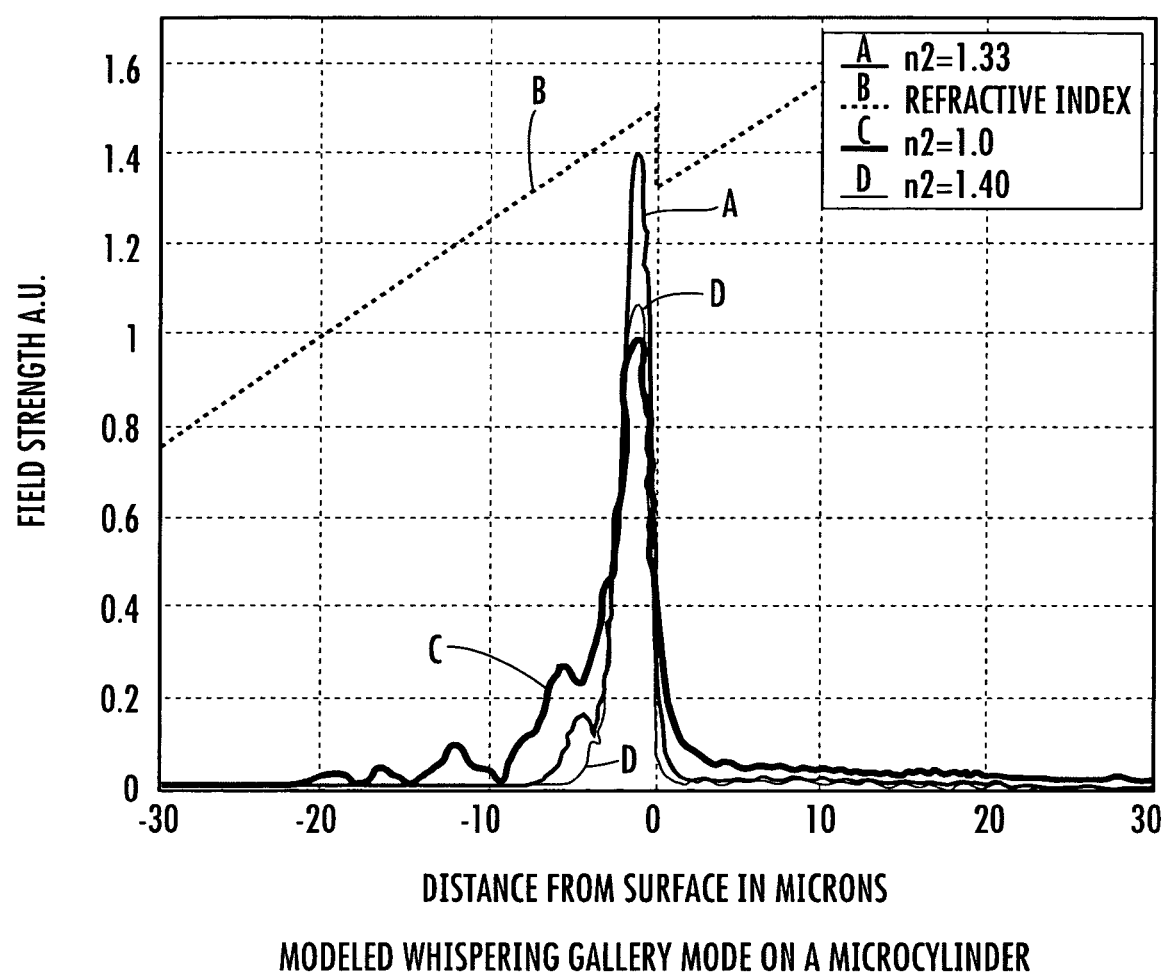
FIG. 9 is a graph showing a modeled whispering gallery mode on a microcylinder and showing the field strength relative to the distance from the surface in microns in accordance with one example of the present invention.

A one dimensional beam propagation coating model could be constructed to represent this effective index profile. FIG. 9 shows the modeled results obtained for a surrounding index of 1.0 (air) and 1.33 (water) outside a 120-micron diameter microcylinder with body index, $n_1$, of 1.498. This E field structure exhibits several modes when the surrounding index is 1.0. At a 1.33 index, the fields are almost single mode and at a 1.40 index there is a clean single mode. The mode for the 1.4 index, however, has some radiation loss as evidenced by the pedestal out to 20 microns on the field pattern outside the microcylinder. A surrounding index of 1.35 to 1.4 is desirable for a 120-micron diameter fused silica rod. The fields are confined to within approximately 3 microns of the surface inside the microcylinder and penetrate less than 1 micron outside the surface. The fields in all cases began as a Gaussian profile with an 8.3-micron mode field diameter. In this model, they are propagated 2 mm or about five times around the microcylinder.

An index transformation can be used to analyze the microcylinder propagation and create resonant waveguides on the cylindrical surface. Because the effective index is directly proportional to the distance from the axis, r, a higher effective index region is created by increasing r. A resonator, i.e., ridge, formed on the microcylinder can become a resonant waveguide even though the actual refractive index of the material in the ridge is identical or substantially similar to that of the microcylinder itself. This is in contrast to a ridge on a planar structure where no low loss guiding is produced unless the index of the ridge exceeds the index of the underlying plane.

A parameter that is used to characterize the guiding power of an optical waveguide is $\Delta=(n_1-n_2)/n_1$. For the ridge-on-a-microcylinder guide, $\Delta=(r_1-r_2)/r_1=h/r$, where h is the ridge height and r is the microcylinder radius. A typical value for $\Delta$ is 0.01. This corresponds to a 0.6 micron high ridge on a microcylinder with a 60 micron radius.

Ridge guiding with homogeneous material enables the manufacture of high quality resonant waveguides. For example, only a photoresist mask could be applied where a waveguide is desired. The surrounding material could be etched to a depth required for the desired index step. A laser could be used to expose pertinent sections of the photoresist. No deposition, etching or modification would be required at the waveguide. This fabrication technique leaves the critical waveguiding region protected by the photoresist and unmarred by any processing. Furthermore, the precision (radius, circularity, etc.) of the original microcylinder is preserved in this type of process. As previously mentioned, many complex and intricate patterns can be created using this laser "lathe" process for writing on the photoresist.

The index transformation described above provides the parameters of a transformed step index in the planar waveguide created by a microcylinder wall. Planar waveguide analysis techniques and the effective index method could be applied to solve for a wave field distribution in the axial (z) direction. A single mode operation for a slab waveguide could follow the function $\Delta=\lambda^2/8h^2n_1^2$. In this case, h is the width of the planar guide, which is the width of the ridge on the microcylinder in one example of the present invention. If a reasonable value of 5 microns is chosen for a ridge width, the $\Delta$ value is D<0.0055 for a single mode operation. This corresponds to a 0.33 micron ridge height on a 60 micron diameter microcylinder.

Figure 10:
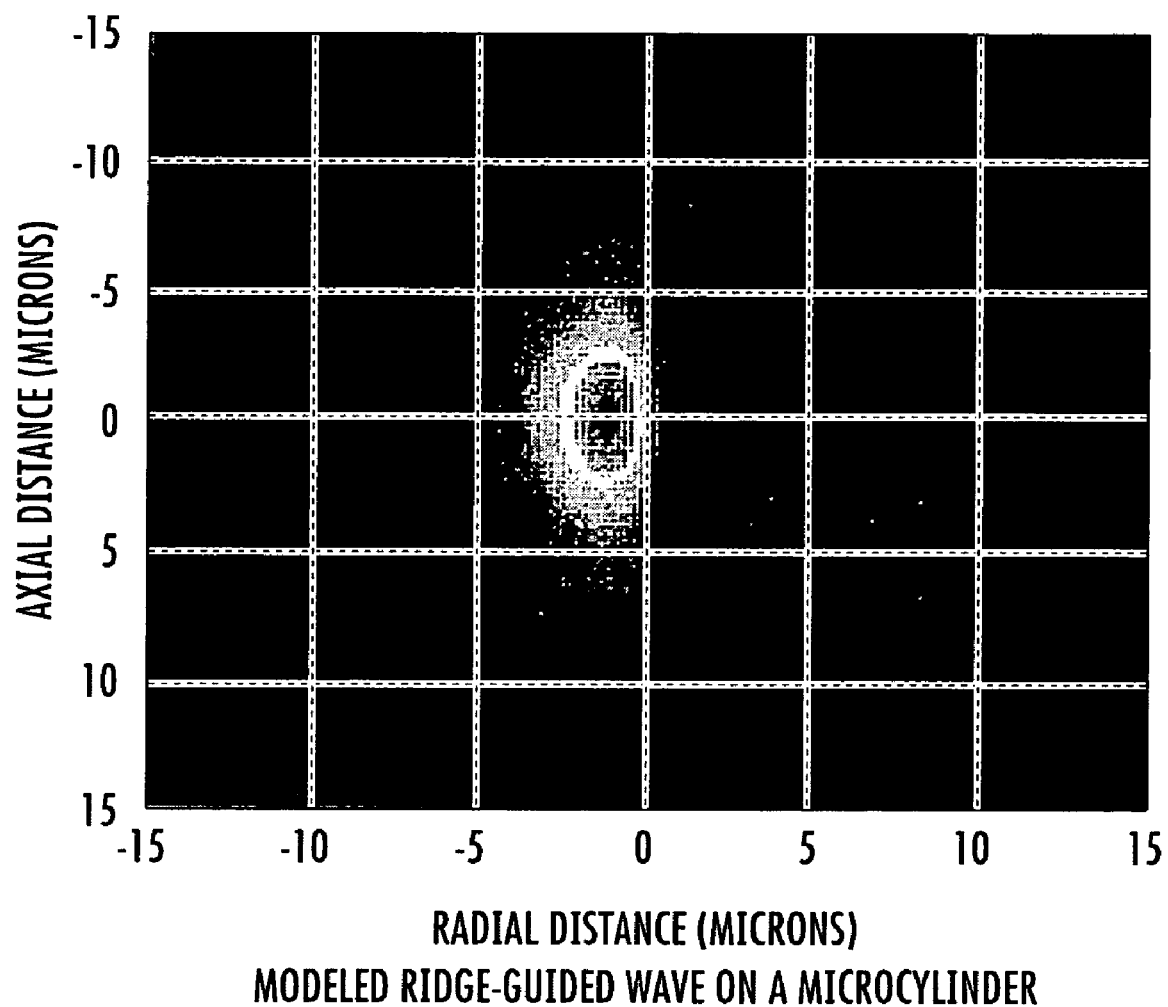
FIG. 10 is a graph showing a modeled ridge-guided wave on a microcylinder of the present invention and showing an axial distance in microns relative to a radial distance in microns.

This geometry could be a good compromise between lateral confinement under a ridge and controllable ridge height. This level of detail will depend, of course, on actual device fabrication techniques and end-use design. A computed result for a modeled ridge-guided wave on a microcylinder is shown in FIG. 10 for a 120 micron diameter microcylinder, immersed in water, with a 0.33 micron ridge of width 5 microns.

In the present invention input-output coupling is possible such as by using an optical source waveguide, e.g. optical fiber, and optical exit waveguide, e.g., another optical fiber, for example as shown in FIG. 5. This system is an improvement over prior art coupling techniques using microspheres, or one tapered optical fiber near a microcylinder. The present invention provides an improved optical microresonator coupling system having a resonant waveguide on the microcylinder in which energy can be coupled into and out of the microcylinder. Coupling occurs when the fields from an optical source waveguide overlap the fields from a microcylinder resonator forming the resonant waveguide. This requires proximity between the guiding core of the optical source waveguide and the guiding core of the microresonator. The interaction length, or propagation distance in both the source and microresonator waveguide over which this proximity must be maintained, is an important parameter in the coupling relationship. The amount of coupling generally varies as the square of the interaction length.

Figure 11:
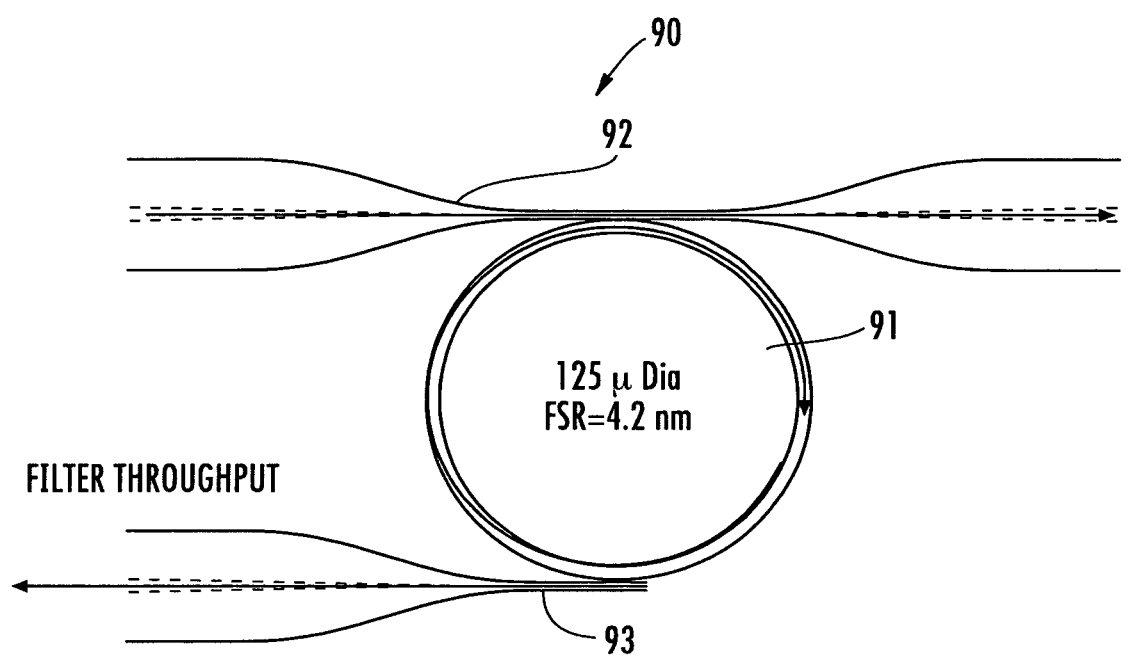
FIG. 11 is a fragmentary side elevation view of a an optical microresonator coupling system used as a filter and showing a microcylinder having a resonant waveguide formed on a microcylinder in accordance with one example of the present invention.

Coupler design and implementation can also use a gradual transition from an unperturbed optical source waveguide into the coupling region and back out again through the optical exit waveguide. For example, FIG. 11 shows a filter 90 using a microcylinder 91 of about 125 microns with a Free Spectral Range (FSR) of about 4.2 nm. An optical fiber 92 is operative as the optical source waveguide and has a transition 92a down to the core, which is placed close to the microcylinder and its resonant waveguide. The filter throughput at the optical fiber 93 operative as the optical exit waveguide is shown at the lower portion and occurs at another transition 93a down to its core. Light enters the fiber transition 92a and is coupled onto the microresonator and is output form the microcylinder through the transition 93a.

In one example of the present invention, a resonant waveguide could be considered to be a single mode waveguide with a field $E_2$. The source could be considered to be a single mode waveguide with field $E_1$. The symmetric power coupling between the two waveguides is c. The value of c can be computed from the field patterns and the coupling perturbation by the equation:

$$\sqrt{c} = -\frac{ke^{-i\beta_2 z}}{N}\int \Delta(\vec{E}_1\cdot\vec{E}_2)e^{-i(\beta_1-\beta_2)z'}dz'dxdy \quad 1)$$

Where N is a normalizing constant $$N=\int(\vec{E}_1\cdot\vec{E}_2)dxdy. \quad 2)$$

$\lambda$ is $\delta n/n$ for the perturbing index variation.

The effects of mode mismatch on microresonator performance can also be analyzed, in accordance with the present invention. For example, a microresonator guide (E2, width 5 microns, D=0.005) can be considered as a perturbation in the field of a ridge waveguide ($E_1$). A beam propagation analysis can be used with the kernel of equation 1 above as a concentrated source in a single plane parallel to the z-axis. No microresonator losses are introduced in this example. The model mismatch loss between the microresonator mode and the optical source mode can be considered the dominant loss. A mode-to-mode overlap of 0.7 causes half the coupled power to go back into the optical source guide and half to be lost in radiation or non-propagation modes. A model calculation for this arrangement was performed and the steady state field patterns for the incident mode, transitioned field, and resonator field are shown in FIG. 12.

Figure 12:
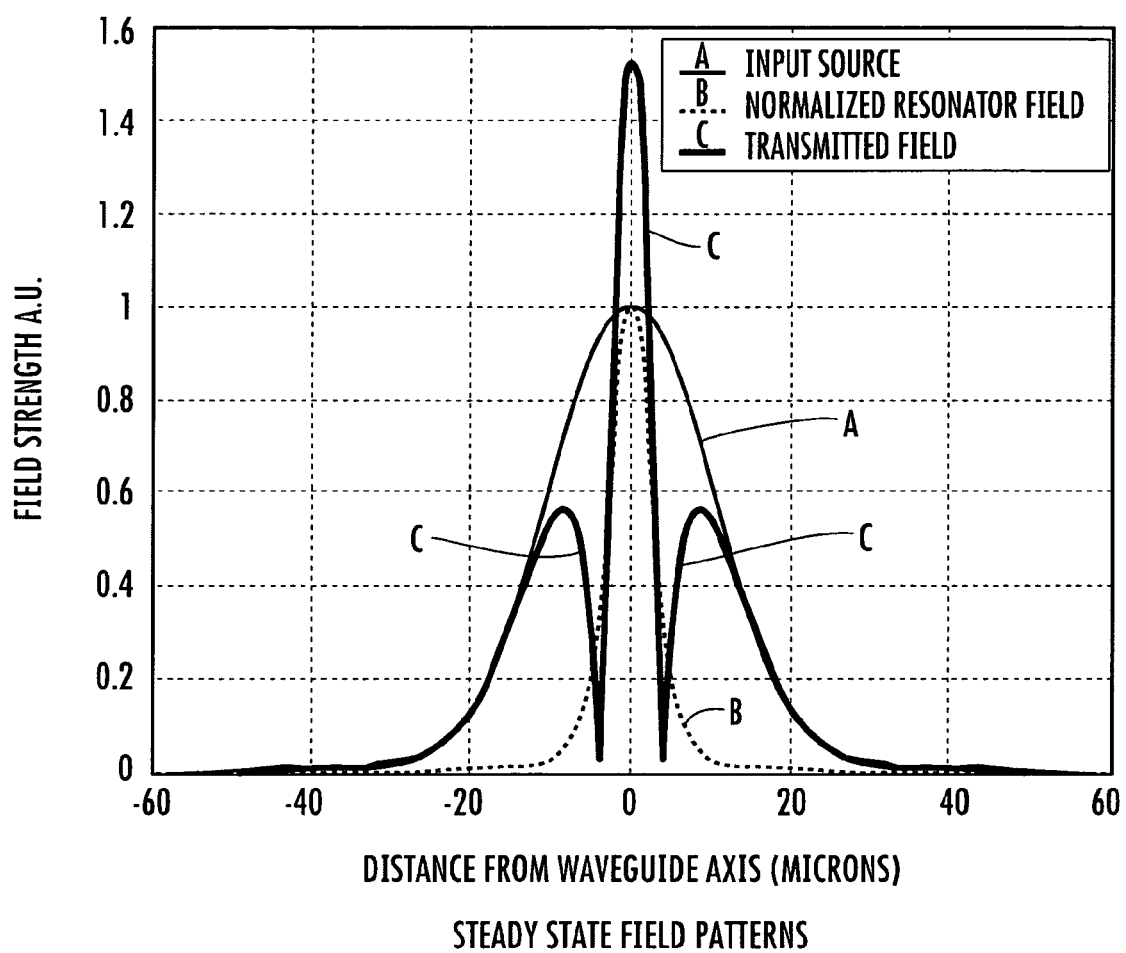
FIG. 12 is a graph showing steady state field patterns in accordance with one example of the present invention and showing the field strength relative to the distance from the waveguide axis in microns.
Figure 13:
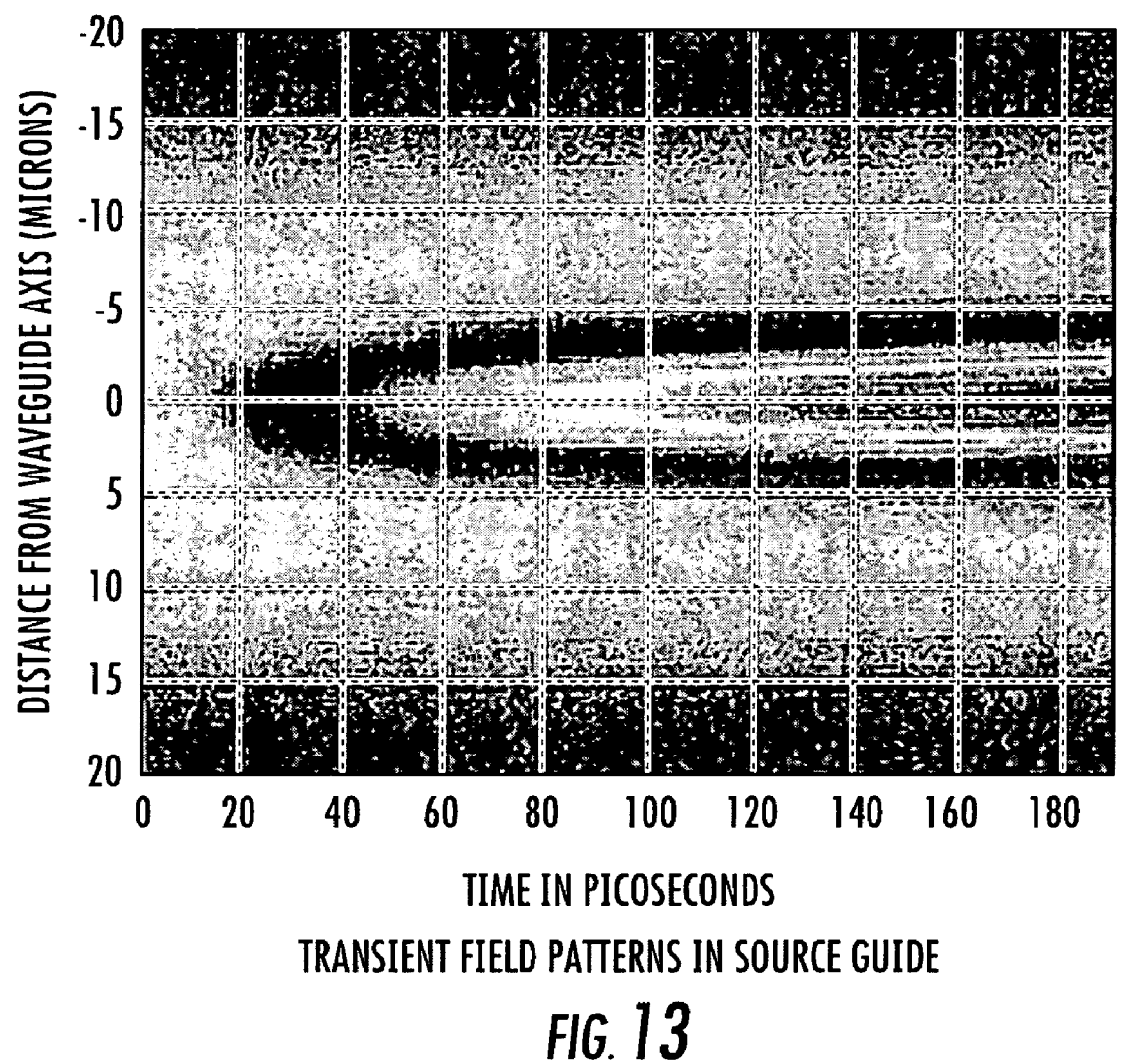
FIG. 13 is a graph showing transient field patterns in a source waveguide and the distance from the waveguide axis and time in picoseconds in accordance with one example of the optical microresonator of the present invention.
Figure 14:
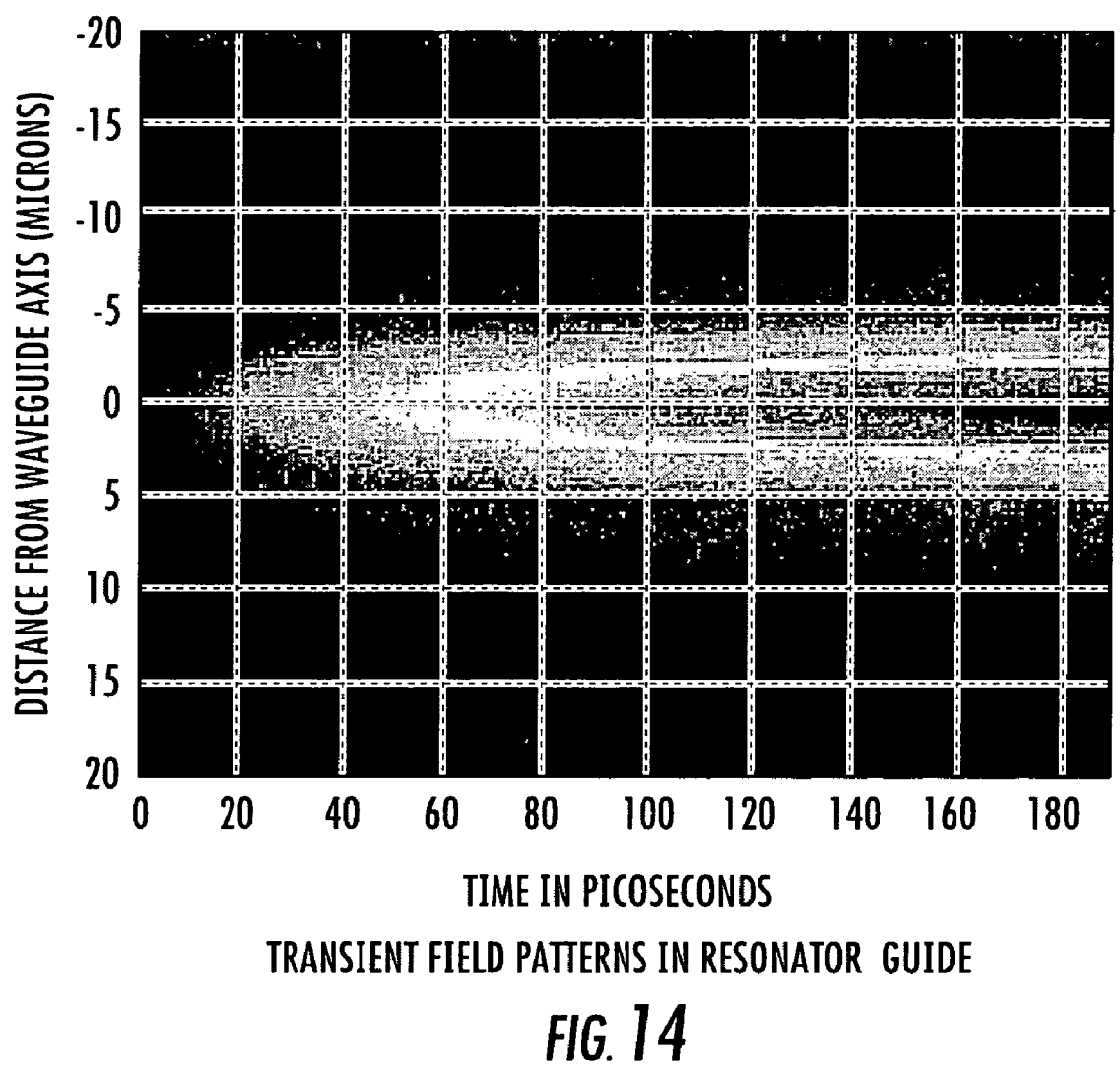
FIG. 14 is a graph showing transient field patterns in an optical microresonator have a resonator waveguide in accordance with one example of the present invention and showing distance from the waveguide axis in microns relative to the time in picoseconds.

The graph in FIG. 12 shows steady state field patterns. The graph line indicative for the transmitted field is plotted as absolute value, such that the negative central field is positive. Although the transmitted field is large, the content of the propagating mode is more than 20 dB below the incident field. The correlation coefficient between the input source mode and the normalized microresonator field mode is 0.71. The formation of the field pattern in the source guide is seen in the transient field pattern shown in FIG. 13. The corresponding field build-up in the microresonator is shown in the transient field pattern of FIG. 14.

These model results are a 50/50 split of the light between scattered modes and the propagating mode. It does not represent a 50% loss in the microresonator, but a 50/50 split between losses and coupling. A 50/50 split can be a target for a loss to coupling ratio.

When using the microcylinders as described above, the microcylinders may exhibit multiple passbands separated by the free spectral range, a frequency interval equal to the reciprocal of the transit time around the microcylinder. Achieving a large free spectral range (FSR) may require a small microcylinder.

Figure 15:
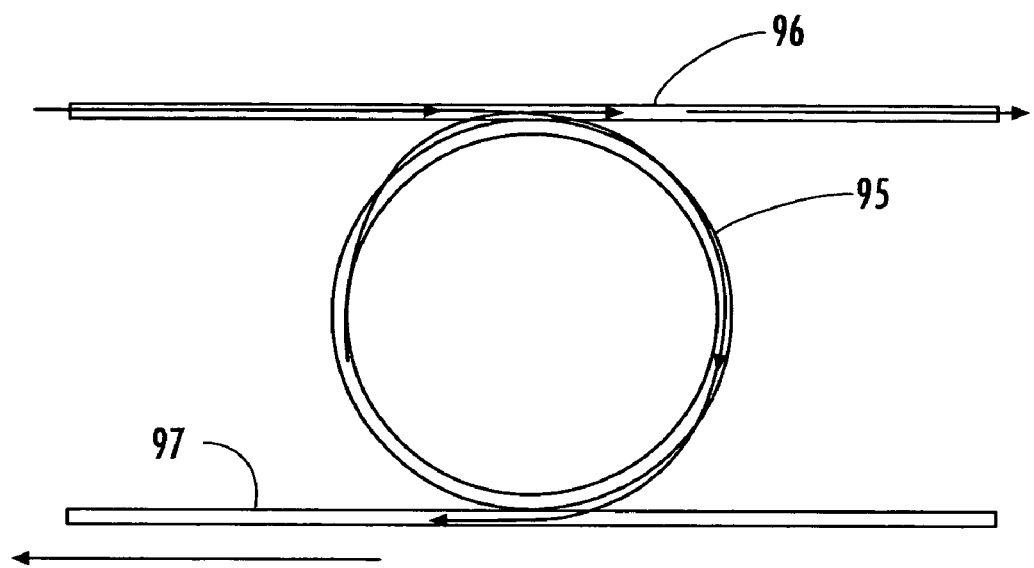
FIG. 15 is a fragmentary side elevation view of an optical microresonator coupling system and showing optical source and exit waveguides located close to the optical microresonator.

As shown in FIG. 15, the zone of contact between the microcylinder 95 (of about 10 microns) and the optical source waveguide 96 and optical exit waveguide 97 are very short for a small microcylinder 95. A 50 micron diameter microcylinder, for example, could provide a contact length of less than 20 microns. Because the power coupling coefficient varies as the square of the coupling length, this short coupling could limit the use of the microresonator in some applications. The multiple passband, FSR and the passband shape of a filter based on a single microresonator could affect performance. A single microresonator has a Lorentzian band shape, which falls off as the first power of the frequency offset from the band center. This is a slow drop for most applications.

Figure 16:
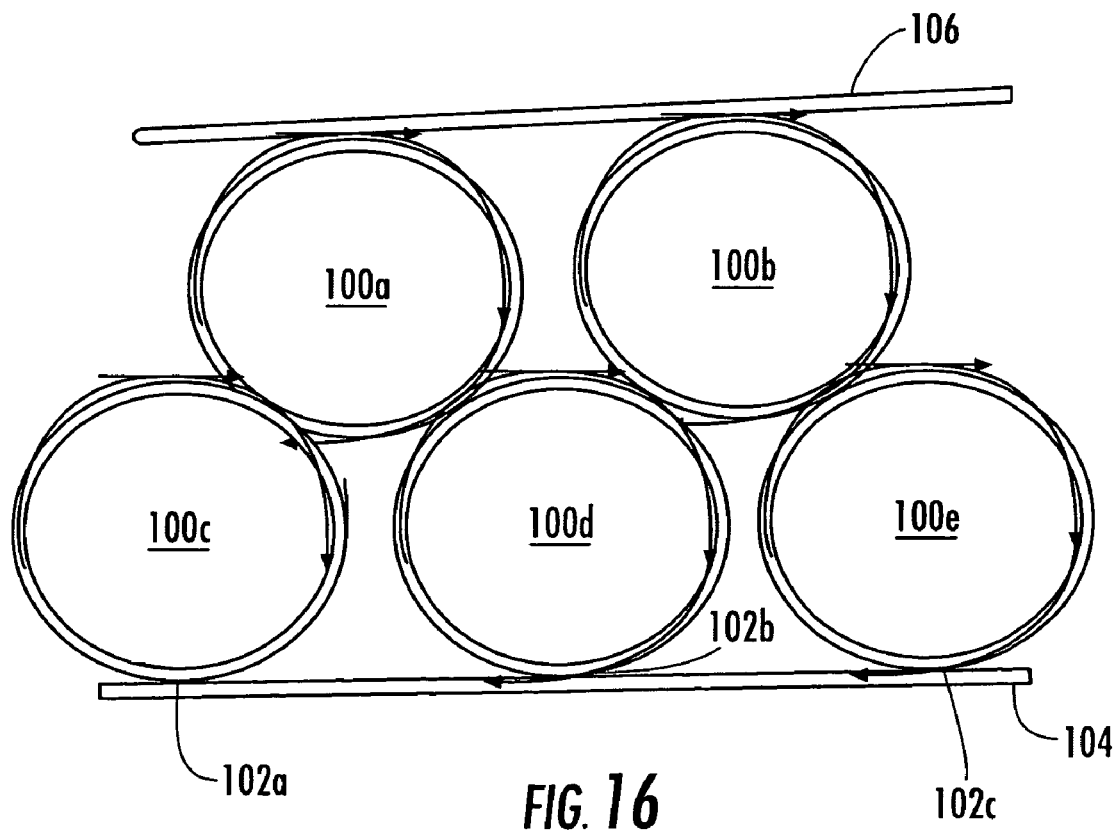
FIG. 16 is a fragmentary side elevation view of a plurality of optical microresonators coupled together and forming a coupled waveguide, microresonator structure in accordance with one example the present invention.

Coupling and FSR can raise other issues. FIG. 16 illustrates coupled optical microresonators as microcylinders, each having a resonant waveguide. Multiple microresonators are coupled to an optical source waveguide and each other. This is extendable to many microresonators. In FIG. 16, five microcylinders 100a-e form a coupled waveguide microresonator structure 101. In one non-limiting example, the structure 101 is a pyramid configuration. Three contacts 102a, 102b, 102c are positioned at the optical exit waveguide 104. Two contacts 102d, 102e are positioned at an optical source waveguide 106. Because the microresonators are mutually coupled, the coupled fields add coherently. Therefore, the three contacts provide a nine-fold increase in coupled power. This complex structure, however, does not always maintain the proper phase relationship between all the coupling points (seven in this example).

In accordance with the present invention, a coaxial microcylinder to optical source waveguide coupling can be established. Some of the phasing and contact spacing problems of the structure in FIG. 16 can be alleviated by placing coupled microcylinders concentrically on the same microcylinder. But contact with multiple microresonators requires that the microcylinder axis lie parallel to the optical source waveguide axis. Coupling from an optical source waveguide into a microresonator requires a coupling element that changes the direction of propagation by 90 degrees (or any angle required to direct the light from the source guide to the resonator guide when the axes are not parallel).

Figure 17:
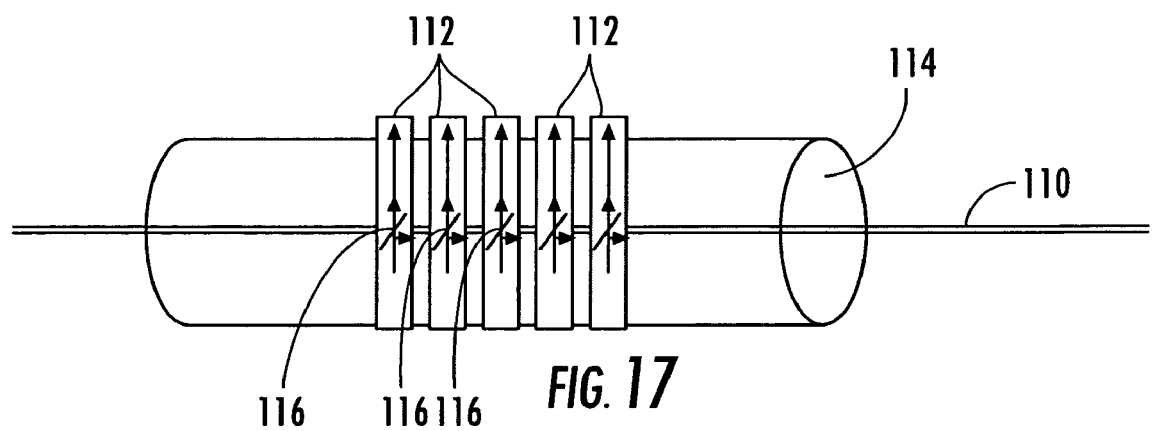
FIG. 17 is a fragmentary isometric view showing an optical microresonator that includes a resonant waveguide and coupling element of the present invention.

A coupling element, for example, a diffraction grating or similar structure, for example, a dielectric line structure as shown in FIG. 17, is one structure possible for achieving this coupling. The coupling elements can couple between waveguide modes and couple from optical waveguides to resonators or ridges forming the resonant waveguide.

FIG. 17 shows an optical source waveguide 110 contacting the top of a series of ridges 112 forming a resonator waveguide on a microcylinder 114. The angled series of lines, forming the coupling element, for example a diffraction grating 116, dielectric line, etched bump, notch, groove or other structure is operative with the resonant waveguide. In some aspects it is directly formed on the ridge and spaced an integral number of wavelengths apart in contact with the optical source guide. The coupling element could be directly on or between the ridges. The resonators or ridges forming the resonant waveguide may be mutually coupled by proximity or by coupling structures overlaid on them. The coupling length of this structure is not limited by the microcylinder geometry and coupling lengths are limited only by the precision required to maintain precise spacing and phase relationships over the structure. If the waveguide resonators or ridges are spaced sufficiently far apart, there will be no mutual coupling and each acts independently. The power coupled from the optical source waveguide varies in direct proportion to the number of resonant waveguides in contact with the optical source waveguide. If there is strong coupling, the coupled power varies as the square of the number of resonant waveguides in contact.

Figure 18:
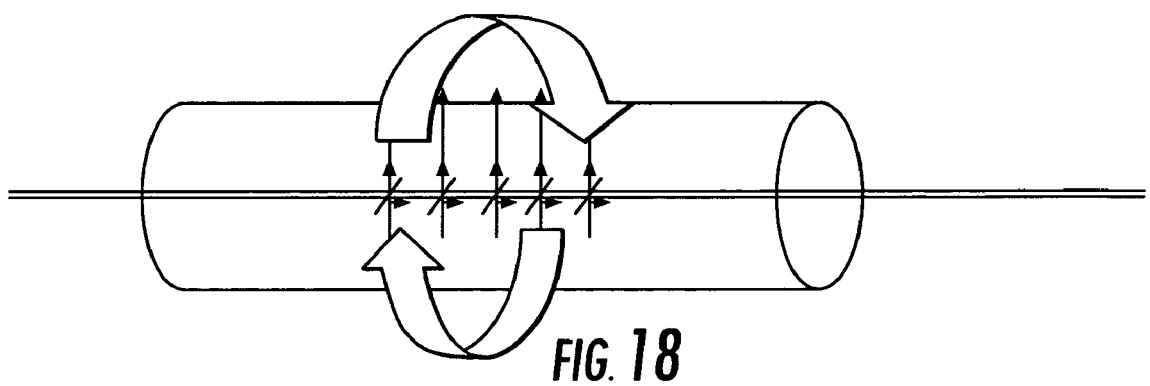
FIG. 18 is another fragmentary, isometric view showing an optical microresonator that has a wide contact, unguided resonator waveguide and coupling element of the present invention.

It is possible that a ridge forming a resonant waveguide would not have to be used. If the grating contact zone is long enough, a broad wavefront, e.g., a one dimensional plane wave, propagates around the microcylinder. Such a wide structure can be designed to have low diffraction losses and no waveguiding is needed. The wide contact, unguided resonator structure shown in FIG. 18 is an example.

For this geometry, the coupling is frequency selective because the direction of the coupled wave steers with wavelength. The frequency selectivity of this mechanism is determined by the axial length of the coupling region in wavelengths. The free spectral range is determined by the circumference of the microresonator in wavelengths. When the coupling length is large, the circumference of the microcylinder and the resolution of the coupling is sufficient to select a single passband from the micro resonator and reject the undesired spectral bands that are one or more free spectral ranges away. This structure solves the problem of achieving sufficient coupling length for good strength of coupling and simultaneously solves the problem of multiple passbands in the microresonators.

Figure 19:
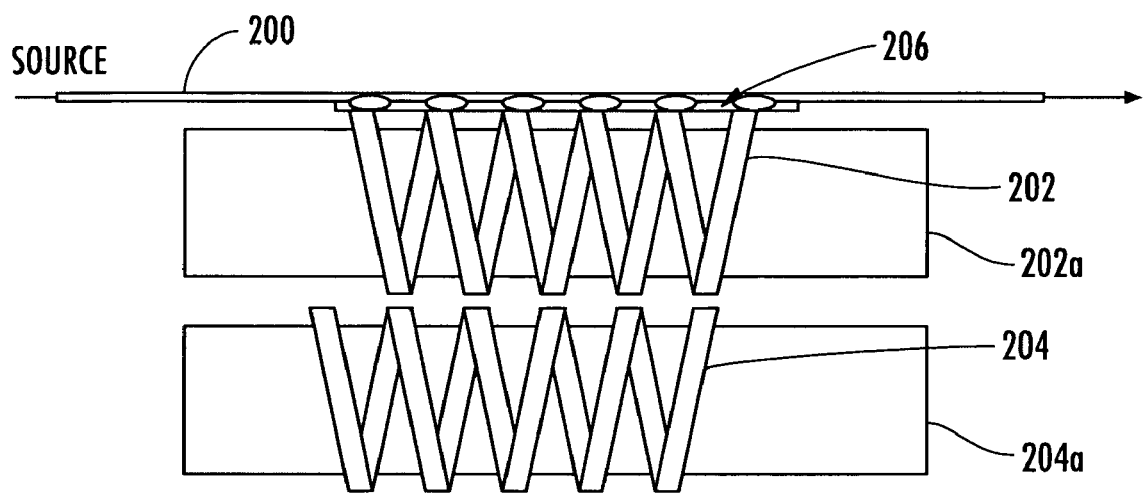
FIG. 19 is a fragmentary side elevation view of two microcylinders each having a spiral resonant waveguide and forming a slow-wave optical microresonator of the present invention.

Another variation on the basic optical microresonator as described is the array shown in FIG. 19. The resonant waveguides are a continuous spiral, instead of parallel bands or ridges. The turns of the spiral may be coupled or uncoupled. This coupling can be controlled by the choice of width and spacing of the turns or by other coupling structures. In this example, the optical source waveguide 200 couples to a resonant spiral waveguide 202, and that guide couples to a second spiral 204, both formed on respective microcylinders 202a, 204a. A coupling element 206, for example a diffraction grating, together with a chosen spiral turn spacing, can be chosen to meet the desired phase matching conditions between the optical source guide and the spiral slow wave structure. The coupling element could be a diffraction grating, etched bump, notches, dielectric lines, or other structure.

The present invention improves upon the prior art optical microresonators such as the published '730 patent application. The present invention can include a resonant waveguide having its ridges forming grooves such that ridges are aligned in a predetermined manner to impart a desired polarization, which can also be accomplished through application of a coating in another aspect of the present invention. The coating can also be advantageous for waveguide slowing and polarization effects. The coupling of ridges with a predetermined groove depth (height), spacing and angle relative to the microcylinder can form a slow wave structure and affect the waveguide coupled resonator and the coupling mode with another optical source guide. The present invention of course allows a multiple contact coupled structure as in the example of FIG. 16 such that filters can be coupled together.

It is possible that resonant waveguides as ridges (and accompanying grooves) do not have to be formed on a microcylinder to form a resonant waveguide and optical microcylinder and, in the present invention, a "stripe" of optical energy can possibly be placed around the microcylinder such that the width of the strip of light going around the microcylinder is not spread and is instead columnated as long as it is not small relative to the order of the wavelength. It is possible to obtain zero birefringence. FIG. 9, for example, shows a modeled whispering gallery mode on a microcylinder. Thus, it is possible that a resonant waveguide using ridges may not be necessary on a microcylinder if a wide stripe of light passes around the optical fiber without spreading. It would be a function of the width of what is being coupled into and the distance around the waveguide relative to an angular spread of optical energy. For example, a large diameter microcylinder with a narrow excitation would not be advantageous because the optical energy would defract as it goes around. It is not dominated by diffraction losses. The present invention allows a microcylinder resonator and a stripe that is wide enough to achieve low enough defraction losses. This is a function of the engineering parameters of the design. A coating would be even more advantageous.

There are advantageous positioning issues because it is not necessary to position the optical source waveguide within two microns of a five micron wide resonant waveguide formed on the microcylinder. Thus, it is not critical where the mode or touching is because it will be operable.

It is also possible to have a tapered optical fiber that may or may not include a resonant waveguide as a ridge and it can be slid back and forth relative to an optical source waveguide for frequency tuning and selection. It should be understood that some of these systems and devices as described are polarization dependent and it is desired in some cases to have polarization independence. In accordance with the present invention, a coating or layer can be applied to the microcylinder to produce a birefringence and bring two polarizations in tune and alignment such that both polarizations are the same within a given wavelength range. The coating could be applied over ridges or other resonators forming the resonant waveguide.

It should be understood that when using an optical fiber, a user generally does not have control over the polarization. It is possible that the ridges or other resonator structure forming a resonant waveguide on the microcylinder as described before, could be made of the right index material and have the right thickness, and thus contain a polarization independent property. As a result, there are a set of parameters operable with the resonators, e.g. ridges, that have the right thickness and right refractive index material, and as a result the polarization independence is established.

In some examples, a ridge by itself with a refractive index the same as the underlying microcylinder material would form a desired resonant waveguide. It is possible to form a resonant waveguide out of higher index material with the proper thickness to set a desired waveguide property. For example, a coating could cause some polarized lights to propagate faster and establish a birefringence. In some instances, a coating alone over the microcylinder not only could produce the desired resonator structure, but also produce the polarization effect and bring polarization states into degenerancy.

Figure 20:
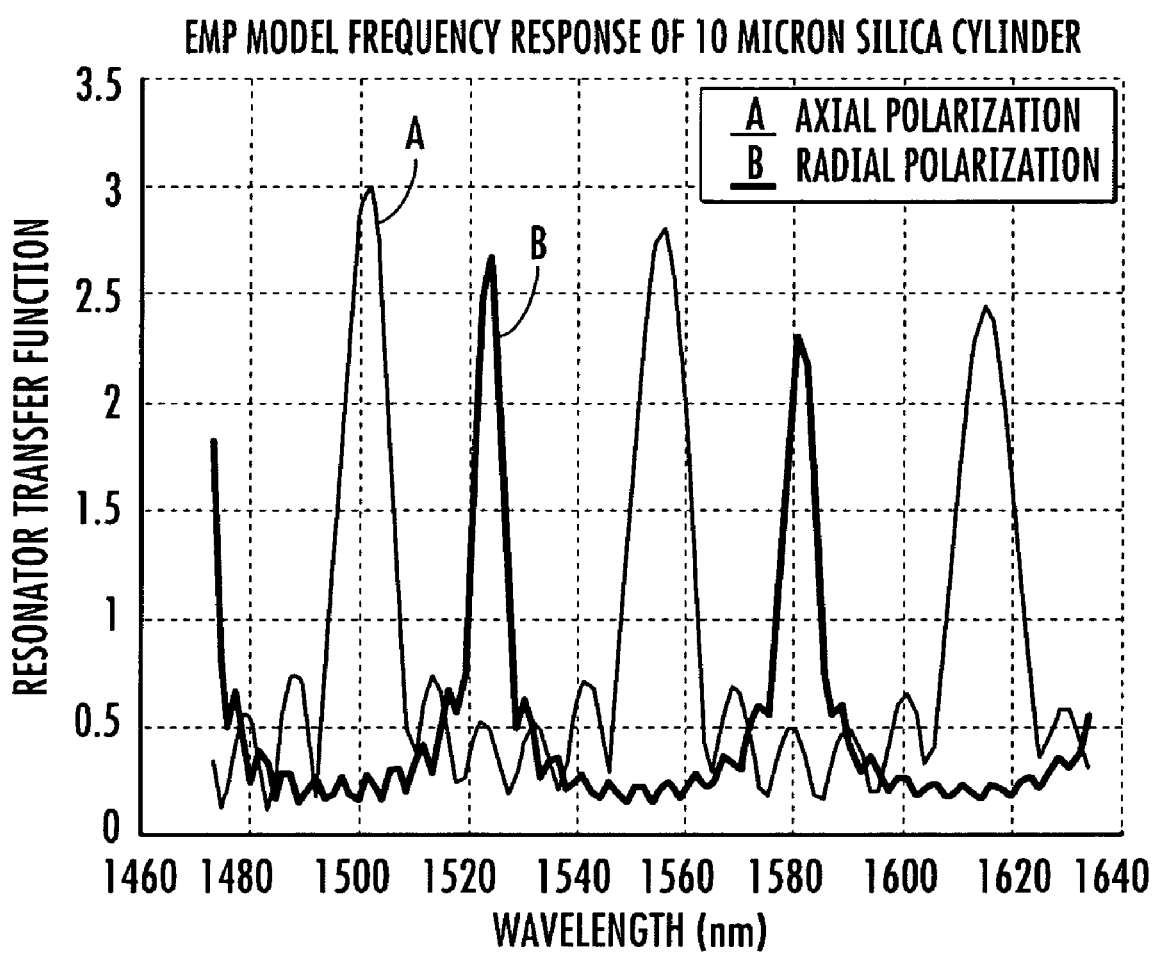
FIG. 20 is a graph showing an EMP model frequency response for a 10 micron silica microcylinder showing the resonant waveguide transfer function on the vertical axis and the wavelength in nanometers on the horizontal axis in accordance with one example of the present invention.
Figure 21:
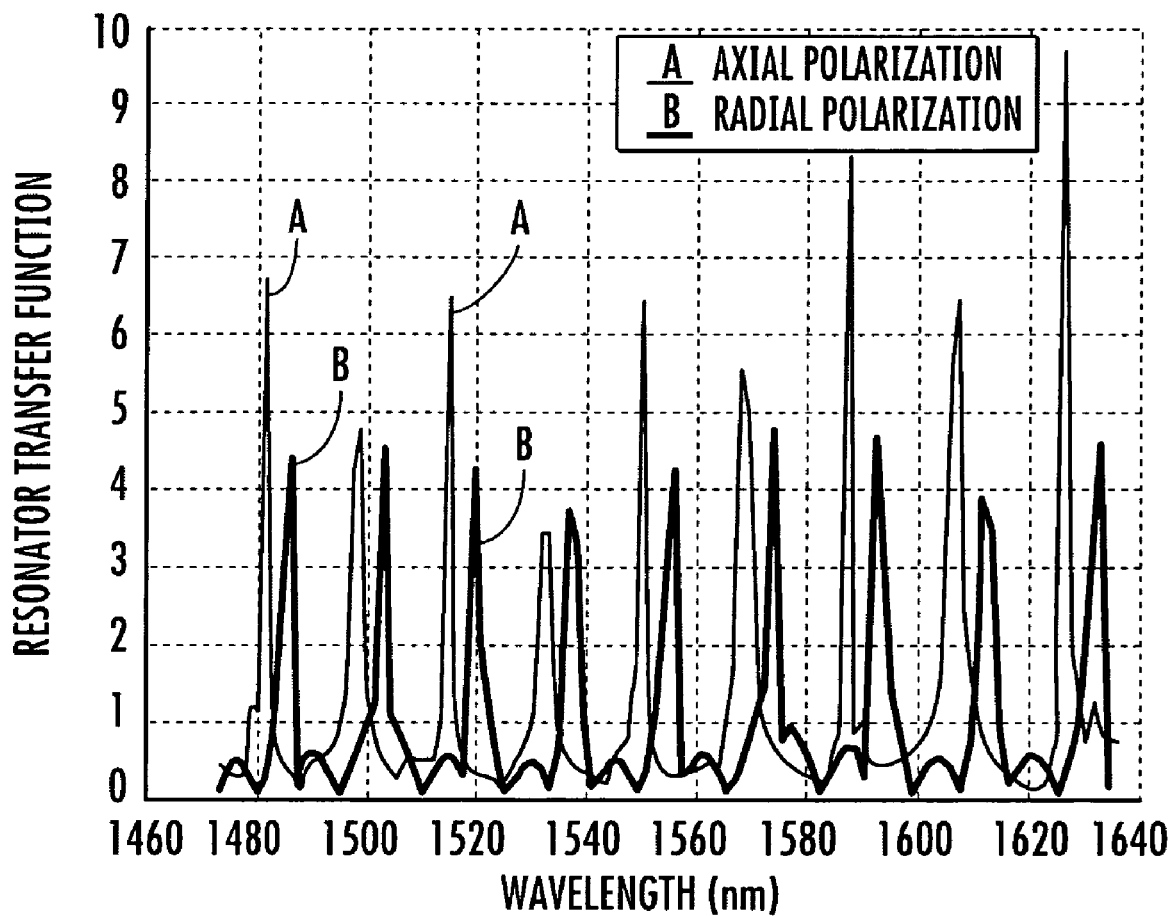
FIG. 21 is a graph similar to FIG. 20, but showing an EMP model frequency response of a 30 micron silica microcylinder and showing in greater detail the axial and radial pole modes remaining separated for all diameters in accordance with the present invention.

FIGS. 20 and 21 show the EMP model frequency response of a respective 10 micron silica microcylinder and a 30 micron silica microcylinder with the axial and radial pole modes shown and remaining separated for all diameters.

Figure 22:
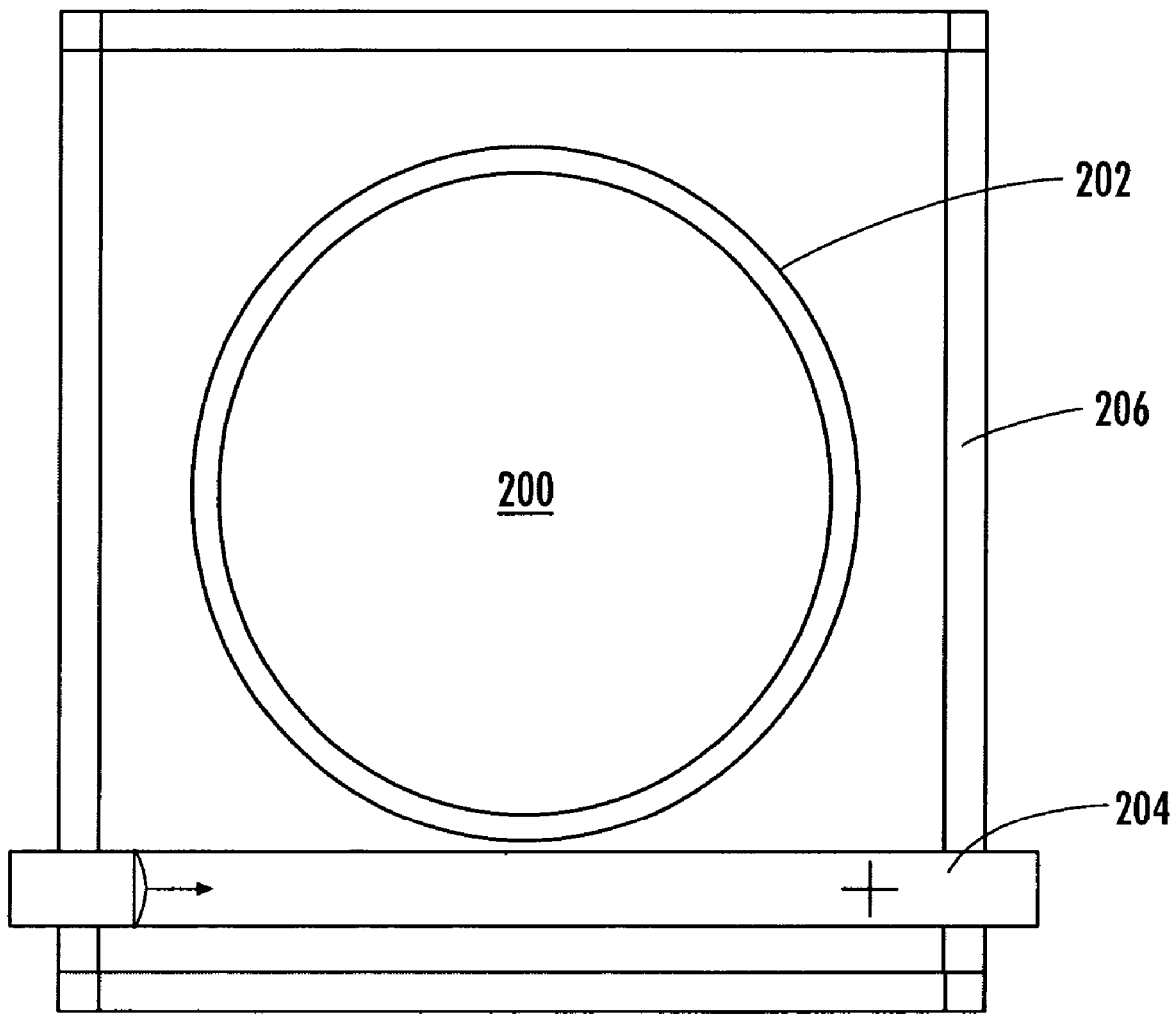
FIG. 22 is a fragmentary elevation view of a coated microcylinder of about 9.5 micron with a 0.4 micron polymer coating to form an optical microresonator in accordance with one example of the present invention.

FIG. 22 shows a non-limiting model for a 9.5 micron cylinder 200 with a 0.4 micron polymer coating 202 and the optical source guide 204 adjacent within a testing chamber 206.

Figure 23:
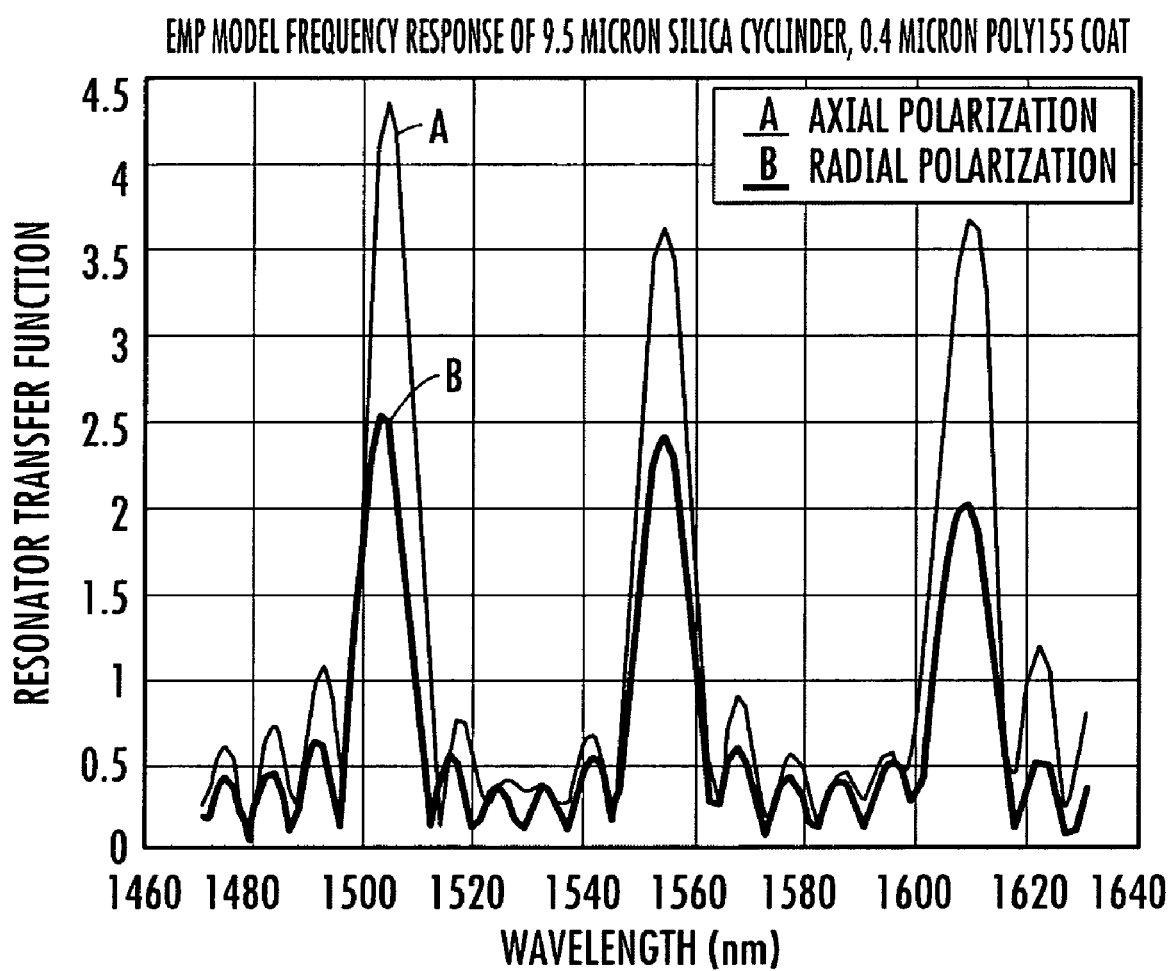
FIG. 23 is a graph showing an EMP model frequency response for a 9.5 micron silica microcylinder coated with a 0.4 micron polymer having a 1.55 index to form an optical microresonator in accordance with one example the present invention.

FIG. 23 shows the EMP model frequency response of the 9.5 micron silica cylinder coated with a 0.4 micron polymer shown in FIG. 22 and having an index of 1.55 and showing the axial polarization and radial polarization and showing a good matching of nodes.

Figure 24:
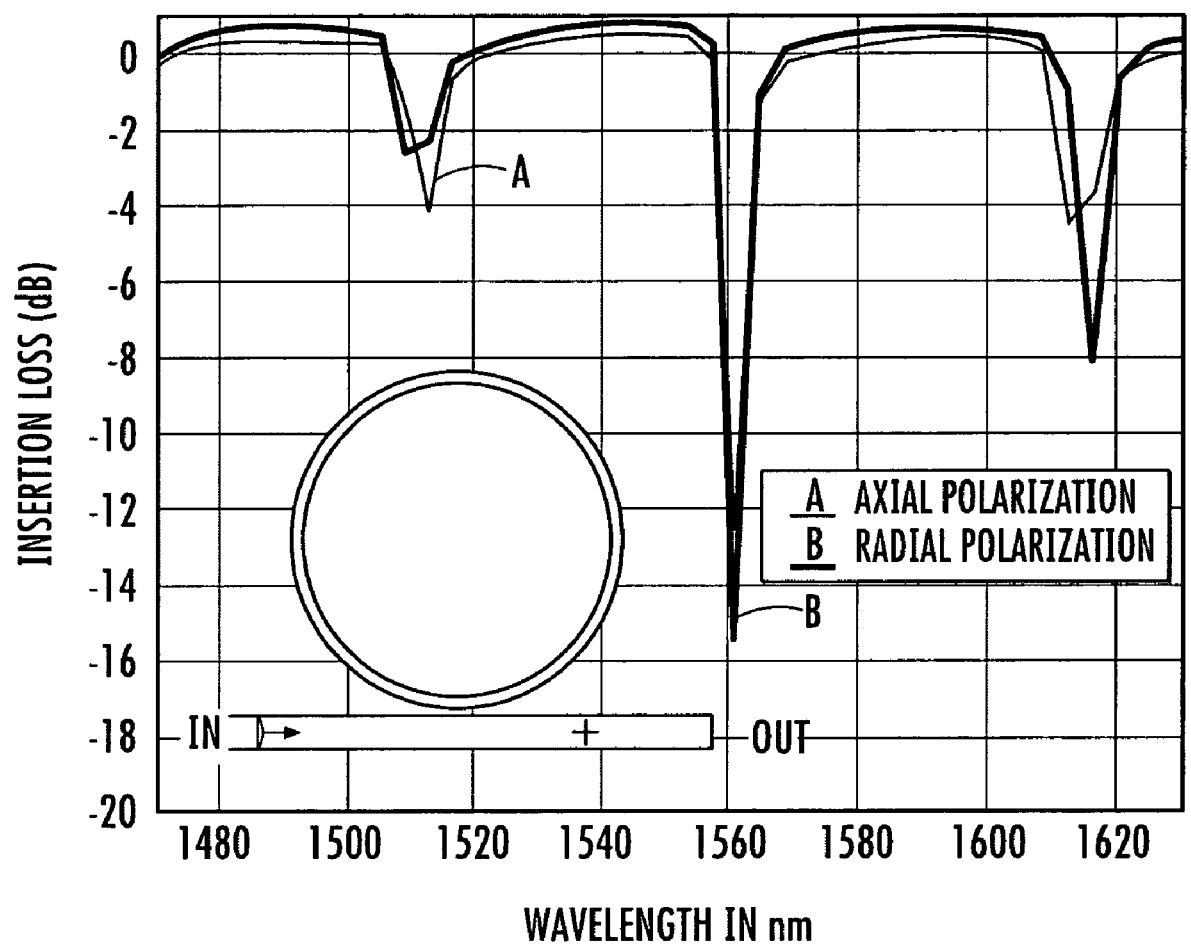
FIG. 24 is a graph showing a Finite Difference Time Domain (FDTD) model and showing the insertion loss of an optical microresonator similar to that shown in FIG. 22 and used as a drop filter in accordance with one example of the present invention.

FIG. 24 shows a finite difference time domain model with the insertion loss of one optical microresonator as a drop filter and shown next to and adjacent the optical source guide as an optical fiber with the optical source waveguide (in) and optical exit waveguide (out).

Figure 25A:
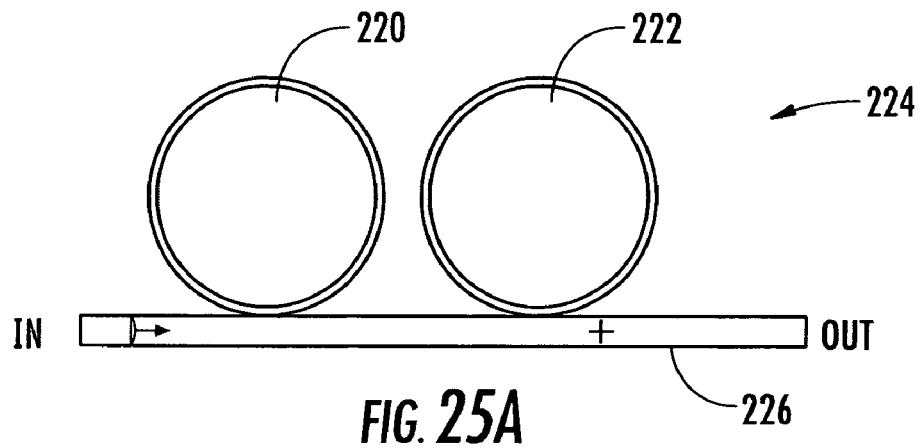
FIG. 25A is a diagram showing two coated, uncoupled optical microresonators used as a drop filter in accordance with one example of the present invention.
Figure 25B:
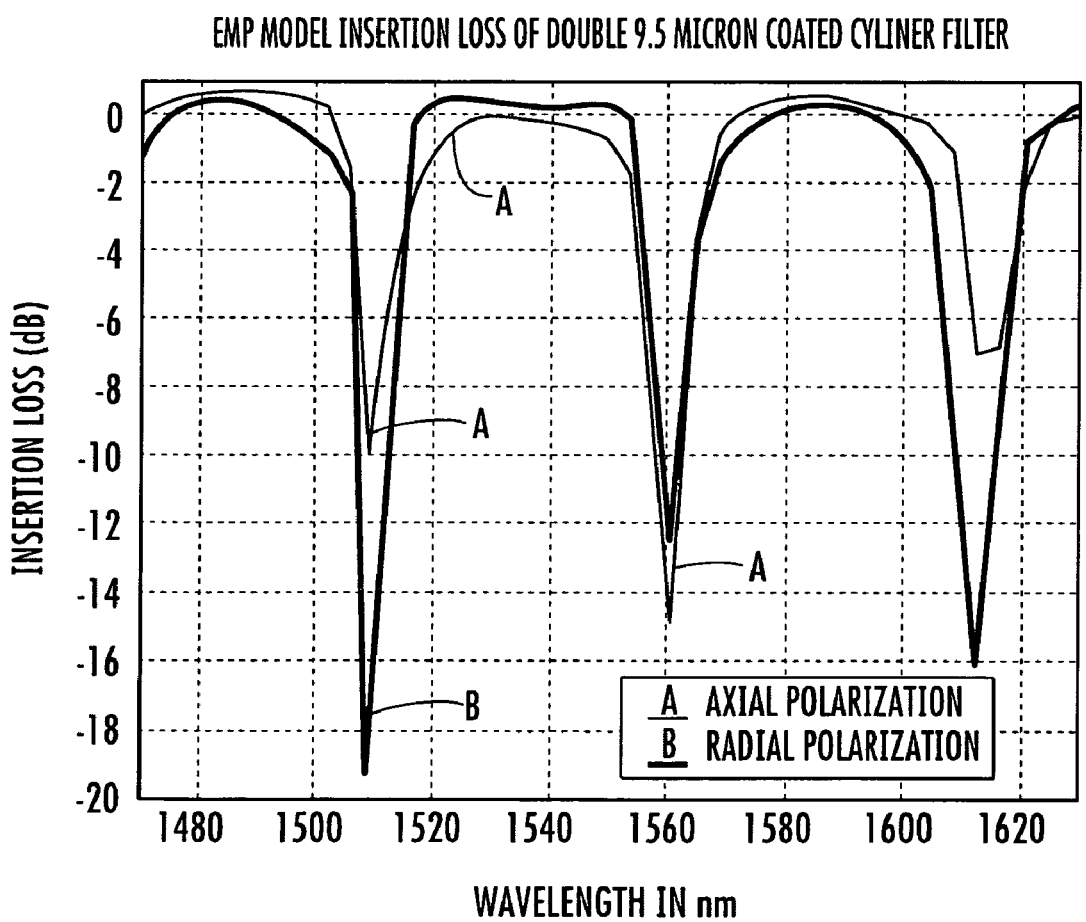
FIG. 25B is a graph showing a finite difference time domain model with the insertion loss for the two uncoupled optical microresonators used as a drop filter in accordance with one example of the present invention.

FIG. 25A shows two uncoupled micro resonators 220, 222 as a drop filter 224 and the In and Out positions of the optical source guide 226. FIG. 25B shows the finite different time domain model using the structure shown in FIG. 25A.

Figure 26:
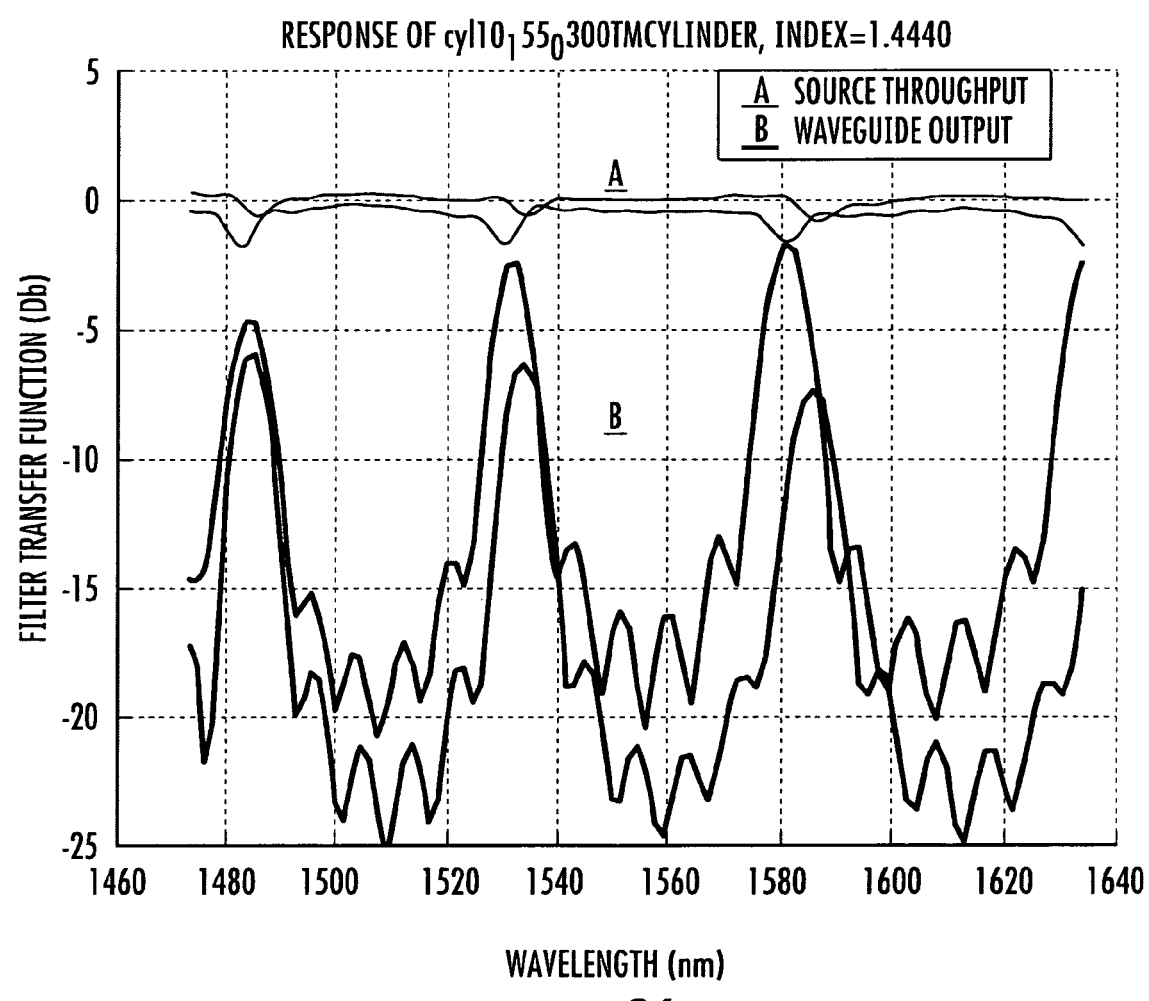
FIG. 26 is a graph showing the response of an optical microresonator formed from a microcylinder having a 300 nanometer thickness film with an index of 1.55 and showing the optical source waveguide throughput and optical exit waveguide output, and a filter transfer function (FTF) in decibels as a function of wavelength in nanometers.
Figure 27:
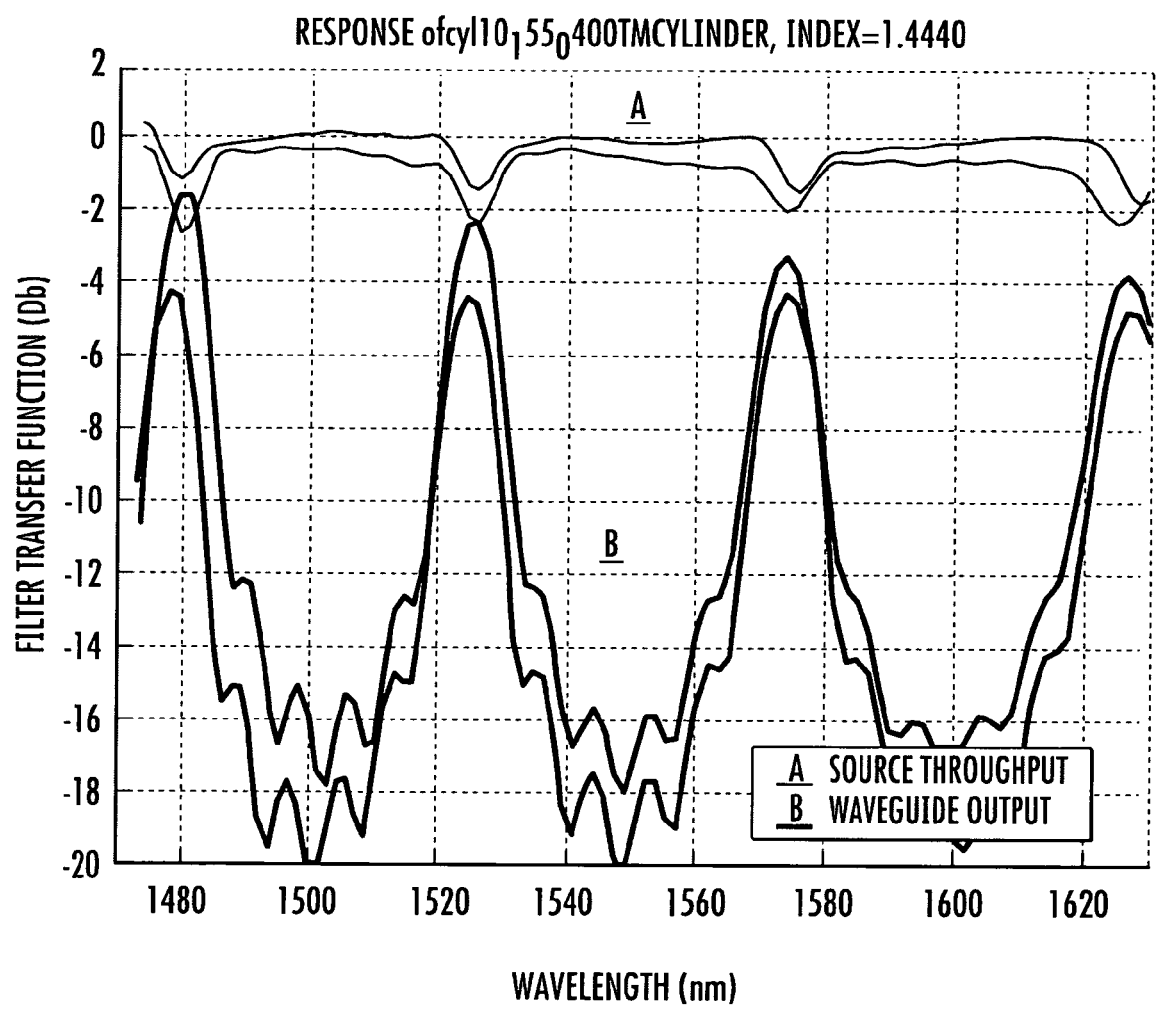
FIG. 27 is a graph similar to the graph of FIG. 26, but showing the optical source waveguide throughput and optical exit waveguide output for the 400 nanometer thickness sample.
Figure 28:
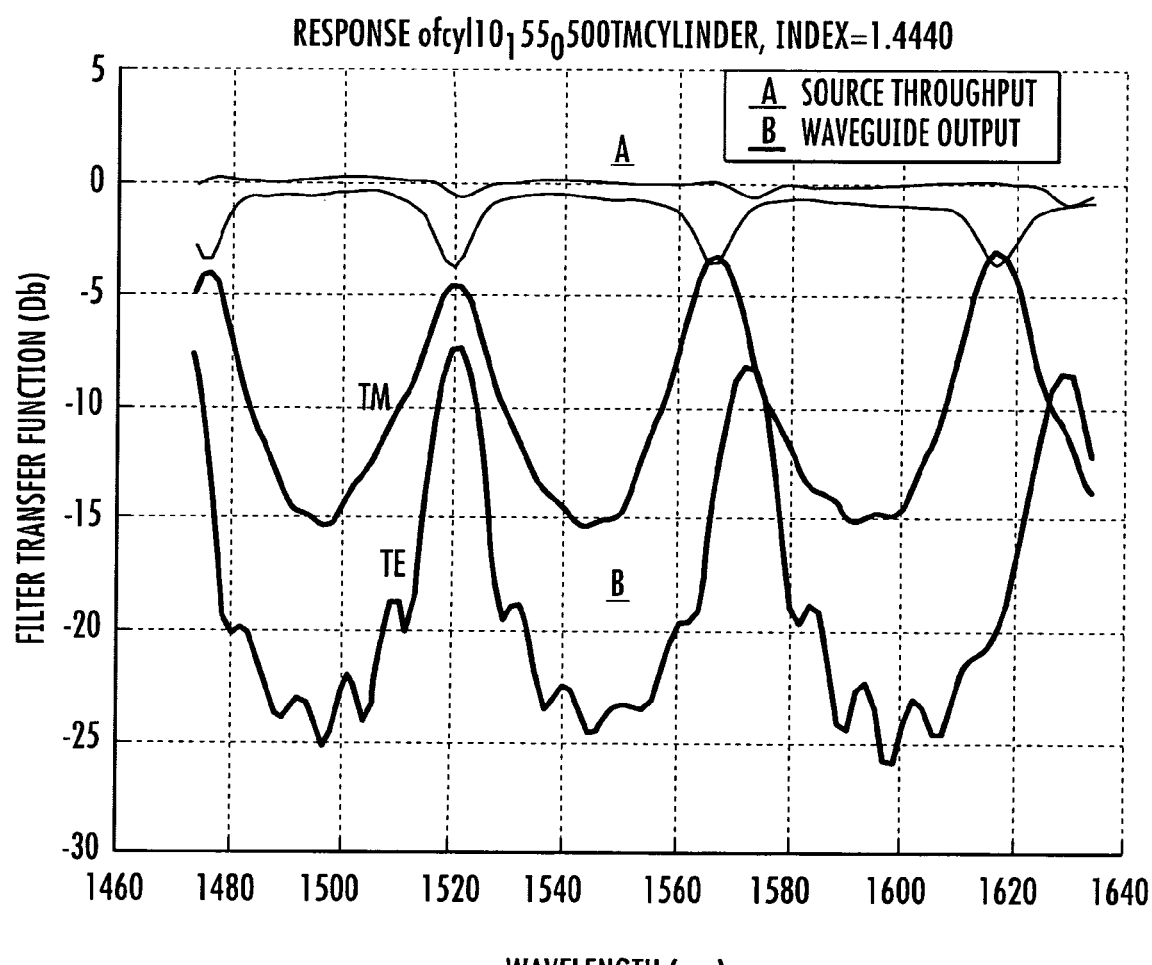
FIG. 28 is a graph similar to FIGS. 26 and 27 for optical source and exit waveguides, but showing a 500 nanometer thickness.

FIGS. 26, 27 and 28 show the response and the filter transform function as a function of the wavelength for respective 300, 400 and 500 nanometer thickness layers with a film index of 1.55 and showing the source throughport and waveguide output.

Figure 29:
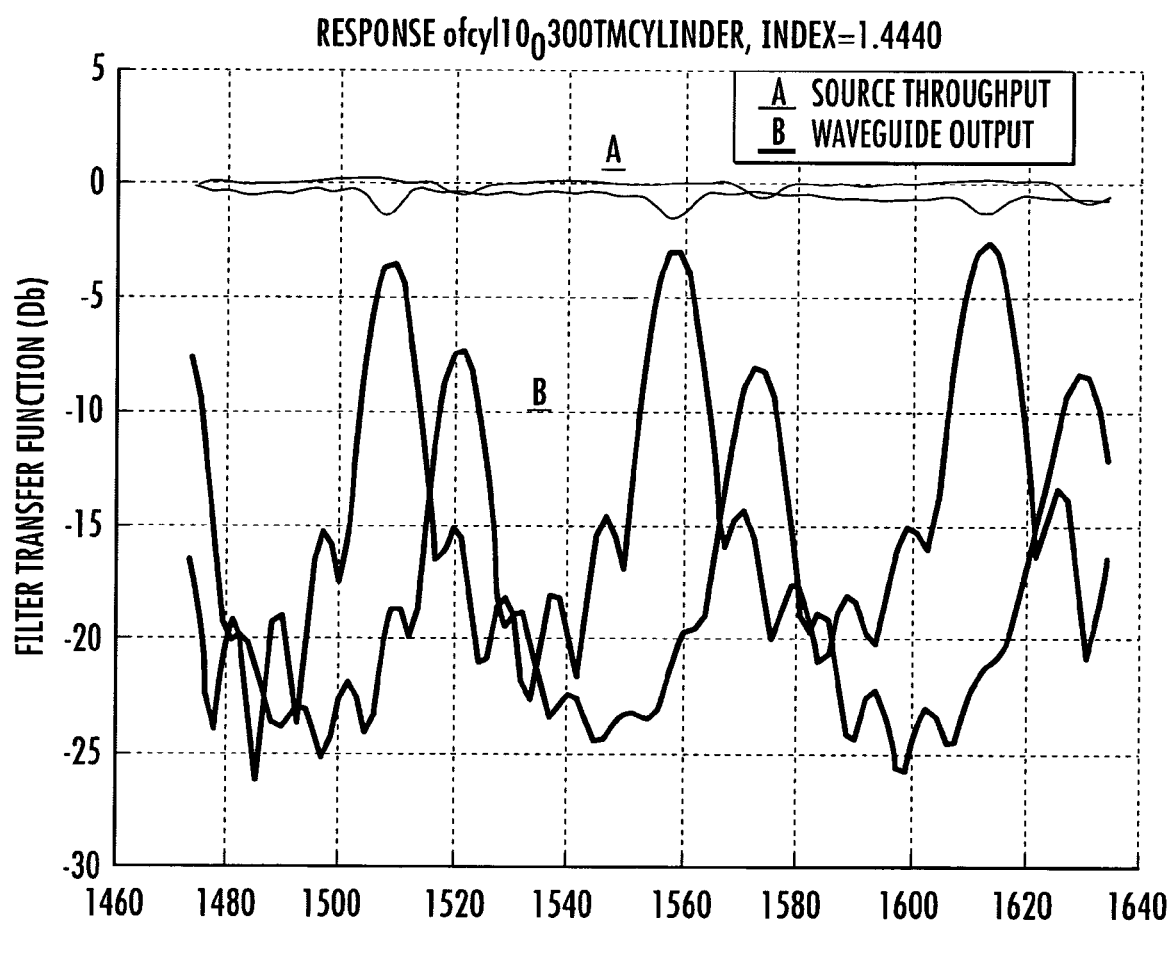
FIGS. 29-31 are graphs similar to FIGS. 26-28, but with microcylinders having with a film index of 1.50 instead of the film index of 1.55, as in graphs shown in FIGS. 26-28.
Figure 30:
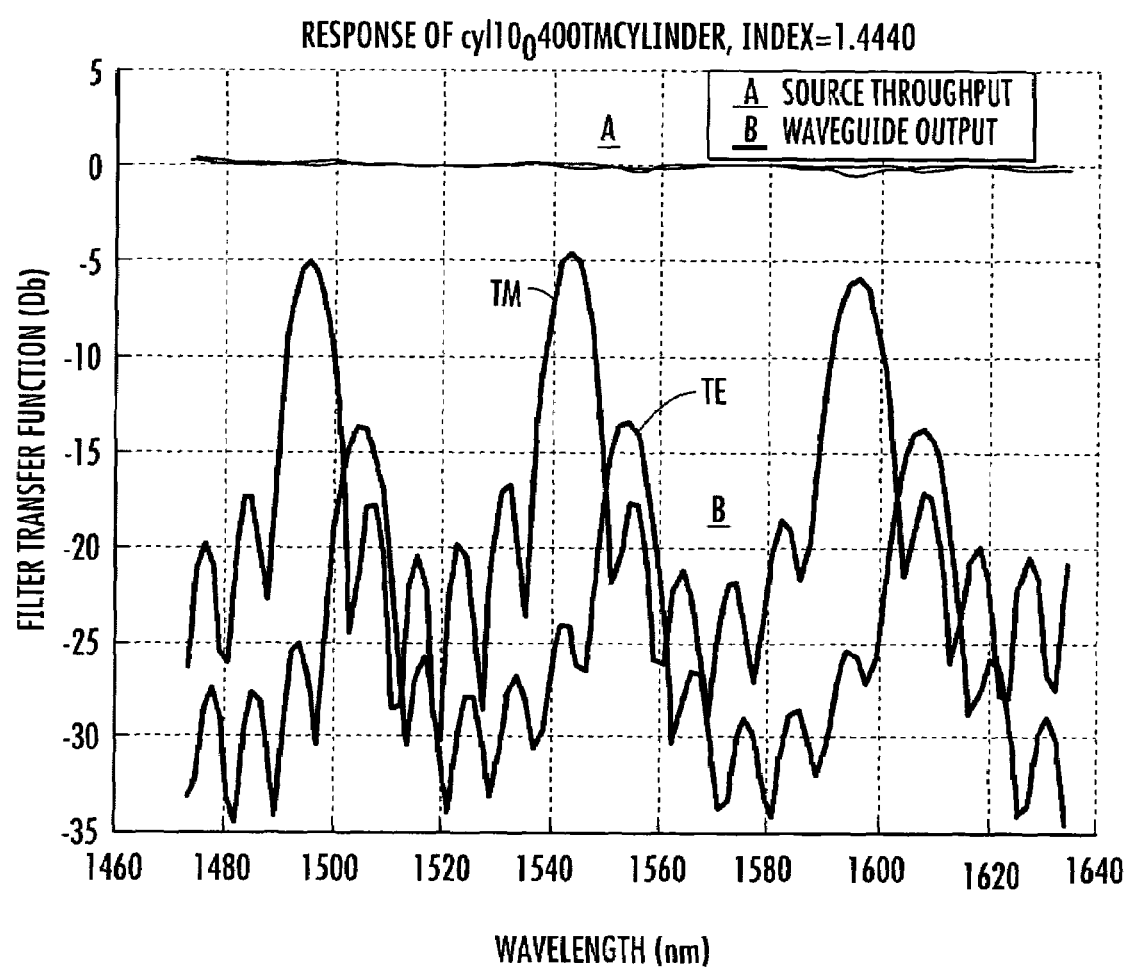
Figure 31:
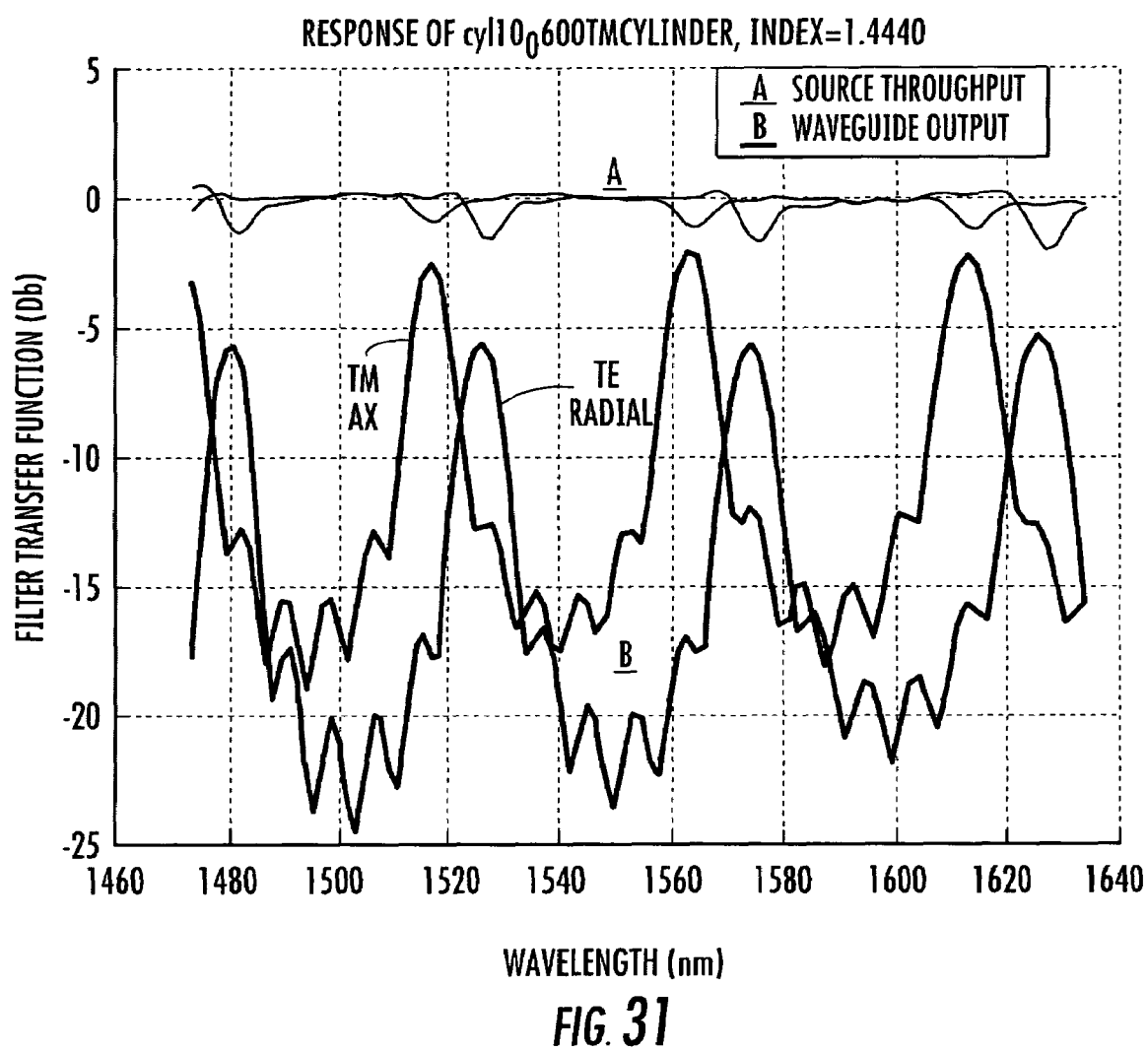

FIGS. 29, 30 and 31 show a response for respective 300, 400 and 500 nanometer coatings of a 1.50 film index and showing the source throughport and waveguide output.

The coating as used in the present invention could be accomplished by dip coating in a solvent until the solvent dries, leaving the coating over the microcylinder. This is similar to spraying on a varnish, where the solvent evaporates and is left over as the coating after drying. This can be accomplished in a controlled manner in the apparatus of FIG. 8. It could also be accomplished before or subsequent to any ultraviolet step in the laser. The circumferential coating could be formed from a polymer, such as a plastic as described before, or a glass. The coating could range in one non-limiting example from about 0.2 to about 1.0 micron thickness on a microcylinder about 8.0 to about 150 microns diameter. The film index could range in one non-limiting example from about 1.4 to about 1.6.

This application is related to copending patent applications entitled, "OPTICAL MICRORESONATOR COUPLING SYSTEM AND ASSOCIATED METHOD," and "APPARATUS AND METHOD FOR FORMING AN OPTICAL MICRORESONATOR," and "COUPLED WAVEGUIDE OPTICAL MICRORESONATOR," and "OPTICAL MICRORESONATOR WITH COUPLING ELEMENTS FOR CHANGING LIGHT DIRECTION," and "OPTICAL MICRORESONATOR WITH RESONANT WAVEGUIDE IMPARTING POLARIZATION," and "SPIRAL WAVEGUIDE SLOW WAVE RESONATOR STRUCTURE," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical microresonator comprising:
a microcylinder having a smooth outer surface; and
a single circumferential coating formed on the smooth other surface of the microcylinder and having a higher index of refraction than the microcylinder, and of such thickness relative to the diameter of the microcylinder that a resonant waveguide is formed such that light optically couples from an optical source waveguide onto the microcylinder and two light polarization states are brought into degenerancy at the same resonant frequency.

2. An optical microresonator according to claim 1 wherein said microcylinder is about 8 to about 150 microns in diameter.

3. An optical microresonator according to claim 1 wherein said circumferential coating is about 0.2 to about 1.0 micron in thickness.

4. An optical microresonator according to claim 1 wherein said circumferential coating has a film index ranging from about 1.4 to about 1.6.

5. An optical microresonator according to claim 1 wherein said circumferential coating is formed from a polymer material.

6. An optical microresonator according to claim 5 wherein said circumferential coating is formed from a plastic material.

7. An optical microresonator according to claim 1 and further comprising coupling elements formed on the coating to change the direction of light coupled onto the microcylinder.

8. An optical microresonator coupling system comprising:
an optical source waveguide that carries light therethrough;
a microcylinder having a smooth outer surface positioned adjacent the optical source waveguide; and
a circumferential coating formed on the smooth outer surface of the microcylinder and having a higher index of refraction than the microcylinder and of such thickness relative to the diameter of the microcylinder that a resonant waveguide is formed such that light optically couples from the optical source waveguide onto the microcylinder, wherein said optical source waveguide forms input and output ports, and including a plurality of microcylinders positioned adjacent the optical source waveguide, each microcylinder having a circumferential coating with a higher index of refraction than the microcylinder and of such thickness such that light optically couples from the optical source waveguide onto the microcylinders to form an add/drop filter.

9. An optical microresonator coupling system according to claim 8 wherein said optical source waveguide comprises an optical fiber.

10. An optical microresonator coupling system according to claim 8 wherein said microcylinder is about 8 to about 100 microns in diameter.

11. An optical microresonator coupling system according to claim 8 wherein said circumferential coating is about 0.2 to about 1.0 micron in thickness.

12. An optical microresonator coupling system according to claim 8 wherein said circumferential coating has a film index ranging from about 1.4 to about 1.6.

13. An optical microresonator coupling system according to claim 8 wherein said circumferential coating is formed from a polymer material.

14. An optical microresonator coupling system according to claim 13 wherein said circumferential coating is formed from a plastic material.

15. An optical microresonator according to claim 8, and further comprising coupling elements formed on the coating to change the direction of light coupled onto the microcylinder.

16. A method of forming an optical microresonator, which comprises:
forming a microcylinder having a smooth outer surface; and
adding a single circumferential coating on the smooth outer surface of the microcylinder having a higher index of refraction than the microcylinder, and of such thickness relative to the diameter of the microcylinder that a resonant waveguide is formed such that light optically couples from an optical source waveguide onto the microcylinder and two light polarization states are brought into degenerancy at the same resonant frequency.

17. A method according to claim 16, which further comprises forming the microcylinder to have a diameter ranging from about 8 to about 150 microns in diameter.

18. A method according to claim 16, which further comprises forming the circumferential coating from about 0.2 to about 1.0 micron in thickness.

19. A method according to claim 16, which further comprises forming the circumferential coating from about 1.4 to about 1.6 film index over the microcylinder.

20. A method according to claim 16, which further comprises forming the circumferential coating as a polymer material.

21. A method according to claim 16, which further comprises forming the polymer material from a plastic material.

22. A method according to claim 16, which further comprises forming coupling elements on the coating to change the direction of light coupled onto the microcylinder.

23. An optical microresonator comprising:
a microcylinder;
a circumferential coating formed on the microcylinder and having a higher index of refraction than the microcylinder, and of such thickness relative to the diameter of the microcylinder that a resonant waveguide is formed such that light optically couples from an optical source waveguide onto the microcylinder; and
coupling elements formed in the coating to change the direction of light coupled onto the microcylinder.

24. An optical microresonator coupling system comprising:
an optical source waveguide that carries light therethrough;
a microcylinder positioned adjacent the optical source waveguide; and
a circumferential coating formed on the microcylinder and having a higher index of refraction than the microcylinder and of such thickness relative to the diameter of the microcylinder that a resonant waveguide is formed such that light optically couples from the optical source waveguide onto the microcylinder, wherein said optical source waveguide forms input and output ports, and including a plurality of microcylinders positioned adjacent the optical source waveguide, each microcylinder having a circumferential coating with a higher index of refraction than the microcylinder and of such thickness such that light optically couples from the optical source waveguide onto the microcylinders to form an add/drop filter.

25. An optical microresonator coupling system comprising:
an optical source waveguide that carries light therethrough;
a microcylinder positioned adjacent the optical source waveguide;
a circumferential coating formed on the microcylinder and having a higher index of refraction than the microcylinder and of such thickness relative to the diameter of the microcylinder that a resonant waveguide is formed such that light optically couples from the optical source waveguide onto the microcylinder; and
coupling elements formed in the coating to change the direction of light coupled onto the microcylinder.

26. A method of forming an optical microresonator, which comprises:

forming a microcylinder;

adding a circumferential coating on the microcylinder having a higher index of refraction than the microcylinder, and of such thickness relative to the diameter of the microcylinder that a resonant waveguide is formed such that light optically couples from an optical source waveguide onto the microcylinder; and forming coupling elements in the coating to change the direction of light coupled onto the microcylinder.

* * * * *